(12) United States Patent
Mitani et al.

(10) Patent No.: US 6,655,168 B2
(45) Date of Patent: Dec. 2, 2003

(54) AIRCRAFT AIR CONDITIONER

(75) Inventors: Hisashi Mitani, Suita (JP); Hidefumi Saito, Ibaraki (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 10/186,749

(22) Filed: Jul. 2, 2002

(65) Prior Publication Data

US 2003/0005718 A1 Jan. 9, 2003

Related U.S. Application Data

(63) Continuation-in-part of application No. 10/061,324, filed on Feb. 4, 2002.

(30) Foreign Application Priority Data

Jul. 5, 2001 (JP) .......................................... 2001-205205
Jun. 11, 2002 (JP) .......................................... 2002-170225

(51) Int. Cl.[7] .............................................. F25D 9/00
(52) U.S. Cl. ............................................ 62/402; 62/87
(58) Field of Search ................................ 62/86, 87, 88, 62/401, 402

(56) References Cited

U.S. PATENT DOCUMENTS

| | | | | |
|---|---|---|---|---|
| 4,018,060 A | * | 4/1977 | Kinsell et al. | 62/91 |
| 4,334,411 A | * | 6/1982 | Payne | 62/86 |
| 5,036,678 A | * | 8/1991 | Renninger et al. | 62/402 |
| 5,169,415 A | | 12/1992 | Roettger et al. | |
| 5,516,330 A | * | 5/1996 | Dechow et al. | 454/74 |
| 6,041,615 A | | 3/2000 | Ostersetzer et al. | |

* cited by examiner

*Primary Examiner*—Henry Bennett
*Assistant Examiner*—Malik N. Drake
(74) *Attorney, Agent, or Firm*—Armstrong, Westerman, Hattori, LLP.

(57) ABSTRACT

An aircraft air conditioner uses a cooling device to cool air extracted from an engine before feeding it into a cabin. This extracted air is mixed with recirculation air that is returned to the cabin after flowing out from the cabin. The mixture of the recirculation air and the extracted air is fed into an air separating section. This air separating section has a selectively permeable membrane that separates the air flowing through an air flow path of the air conditioner into nitrogen-enriched gas and oxygen-concentrated air. The nitrogen-enriched gas is capable of being fed into a fuel peripheral region of the aircraft, and the oxygen-concentrated air is capable of being fed into the cabin.

15 Claims, 14 Drawing Sheets

AIRCRAFT AIR CONDITIONER

CROSS REFERENCE TO RELATED APPLICATION

This is a continuation-in-part application of patent application Ser. No. 10/061,324 filed on Feb. 4, 2002.

FIELD OF THE INVENTION

The present invention relates to an air conditioner that controls the internal temperature, oxygen partial pressure and pressure of aircraft, including fixed-wing aircraft and rotating-wing aircraft and that supplies air of reduced oxygen concentration to the fuel system.

DESCRIPTION OF THE RELATED ART

As air conditioners in aircraft, conventionally air cycle cooling devices are chiefly employed in which temperature-adjusted and pressure-adjusted cooled air is obtained by using a radial compressor to perform adiabatic compression of extracted air compressed in a compression section of an engine after subjecting the air to heat exchanging with external air for cooling, and by using an expansion turbine to perform adiabatic expansion of the air after subjecting the adiabatic compressed air to heat exchanging with external air for cooling.

Some military aircraft are provided with an OBIGGS (on board inert gas generation system) whereby nitrogen gas or air of elevated nitrogen concentration is injected into the fuel tank in order to prevent explosion in the event of the fuel tank being hit during a mission. Also, accident investigations of civil aircraft in recent years have revealed occurrences of fire when sparks generated from on-board wiring etc have ignited a mixture of air and fuel vapor accumulated in the space within fuel tanks. In order to prevent such fires, adoption of the above OBIGGS in civil aircraft is being studied.

This OBIGGS comprises an air separation section having a function of separating air constituents. In one type of air separation section, a selectively permeable membrane is employed whose permeability for nitrogen is higher than its permeability for oxygen. Nitrogen-enriched gas is generated by introducing air extracted from the engine to this selectively permeable membrane.

In the conventional aircraft air conditioner shown in FIG. 14, air extracted from engine 101 is cooled by a heat exchanger called a pre-cooler 102 before being practically adiabatically compressed by a radial compressor 103; the air which has thereby been raised in temperature is cooled by a heat exchanger called a main cooler 104 and practically adiabatically expanded by expansion turbine 105. Cooled air is thereby obtained. In this pre-cooler 102 and main cooler 104, cooling is performed by external air passing through ram air flow path 109. The expansion work of this expansion turbine 105 is utilized as compressive power by being transmitted to compressor 103 through shaft 106. It should be noted that when the aircraft is on the ground or in low-level flight, the external air temperature is high and the moisture content of the air is high, so when expansion takes place in expansion turbine 105, moisture in the air condenses and a mist of water droplets is formed. A water separator 107 is therefore arranged downstream of expansion turbine 105 to capture the moisture. Cabin cooling is performed by supplying the cooled air that has passed through this water separator 107 to the interior of cabin 108, including the cockpit space of the aircraft. If the engine is stopped while the aircraft is on the ground, it is arranged to be possible to supply extracted air from a high-pressure air supply unit such as an auxiliary engine called an auxiliary power unit, instead of engine 101, to the air conditioner.

In order to perform cabin heating at high altitude etc, a bypass air flow path 111 is provided to feed air extracted from engine 101 into cabin 108; this bypass air flow path 111 is opened/closed by means of a hot-air modulating valve 112. Some of the extracted air is fed to a mixing duct 113 arranged downstream of water separator 107 instead of being cooled by the air cycle cooling device constituted by compressor 103 and expansion turbine 105, by opening this hot-air modulating valve 112. In this mixing duct 113, extracted air cooled by the air cycle cooling device and extracted air that has not been cooled are mixed. Air of a suitable temperature is thus obtained by adjusting the degree of opening of hot-air modulating valve 112. Cabin heating can be performed by supplying this air of suitable temperature into cabin 108. When cruising at high altitude, the ram air flow path 109 is throttled, so the air extracted from engine 101 is kept in a moderately high temperature since it is not excessively cooled in pre-cooler 102 or main cooler 104. The air within this cabin 108 is discharged directly into the space 114 outside the fuselage through pressure reducing valve 110 in an amount corresponding to the difference obtained by subtracting the amount of leakage from the fuselage from the amount supplied by the air conditioner.

The conventional OBIGGS is provided with an air separation section 116 independent of the air cycle cooling device constituted by the compressor 103 and the expansion turbine 105. Specifically, a branch air flow path 111a is provided so that the extracted air passing through the pre-cooler 102 is branched before being fed into the air cycle cooling device, and an air separating section 116 is provided in this branch air flow path 111a. This air separating section 116 is constituted by covering a selectively permeable membrane 116a comprising a large number of hollow fibers with a housing 116b. The permeability for nitrogen ($N_2$) and carbon dioxide ($CO_2$) in the air of this selectively permeable membrane 116a is made higher than its permeability for oxygen ($O_2$). The extracted air of engine 101 is separated into nitrogen-enriched gas passing through this selectively permeable membrane 116a and the remainder, oxygen-concentrated air. The nitrogen separating ability of this selectively permeable membrane 116a varies in accordance with the extracted air pressure. The nitrogen-enriched gas is supplied into a fuel peripheral region 115 such as the interior of the fuel tank or fuel pipe setting region, and the remainder of the gas that is supplied to the region 115 more than needed is discharged to the space 114 outside the fuselage through a discharge flow path. The oxygen-concentrated air that has not permeated through the selectively permeable membrane 116a is discharged into the space 114 outside the fuselage from a pressure reducing valve 110a.

The conventional air separating section 116 is provided independently of the air cycle cooling device constituting the air conditioner. The air of raised oxygen concentration obtained by separating the nitrogen by means of the air separating section 116 is therefore wasted without being effectively utilized. Furthermore, if both the air cycle cooling device and air separating section 116 are employed in parallel, the engine load is increased due to increase in the amount of air extracted from the engine.

Since the engine output is throttled during the descent of the aircraft, the pressure of extracted air from the engine is lowered. When this extracted air pressure drops, the nitrogen separating ability of the selectively permeable membrane 116a drops. Furthermore, fuel is consumed and the empty volume within the fuel tank becomes large when the aircraft descends after cruising, in which a large amount of nitrogen enriched gas becomes necessary. As a result, supply of the nitrogen-enriched gas required becomes insufficient.

Furthermore, the air supplied into the cabin 108 by the conventional air conditioner is discharged to outside the fuselage. That is, since the internal pressure of the cabin 108 is higher than the pressure outside the fuselage at high altitudes, the air having this pressure difference is wasted without being effectively utilized.

An object of the present invention is to provide an aircraft air conditioner capable of solving these problems.

SUMMARY OF THE INVENTION

An aircraft air conditioner according to the present invention wherein air extracted from an engine is cooled by a cooling device and fed into the cabin of the aircraft, comprising: an air separating section having a selectively permeable membrane arranged at a position through which air flowing in an air flow path of the air conditioner passes, so that it separates the air into nitrogen-enriched gas and oxygen-concentrated air, wherein the nitrogen-enriched gas can be fed into a fuel peripheral region of the aircraft, and this oxygen-concentrated air can be fed into the cabin. Preferably there is provided a recirculation air flow path through which air flowing out from the cabin is returned to the cabin, wherein the recirculation air flow path and the air flow path of the extracted air from the engine are connected to each other such that the recirculation air that is returned to the cabin after flowing out from the cabin is mixed with the extracted air, and the mixture of the recirculation air and the extracted air is fed into the air separating section.

According to the present invention, the oxygen-concentrated air from which nitrogen is separated by the air separating section is effectively utilized by being returned to the cabin. Also, when both the cooling device and air separating section are employed at the same time, the engine load can be reduced by restricting the increase of the amount of air extracted from the engine.

Preferably the cooling device comprises a compressor and an expansion turbine, and the mixture of the recirculation air and the extracted air is fed into the air separating section after being compressed by the compressor of the cooling device.

In this way, by utilizing the compressor of the cooling device, the pressure of the mixture of the recirculation air and the extracted air can be raised to the necessary pressure for separating the air constituents by the selectively permeable membrane of the air separating section.

In this case, preferably a normally open air flow path is provided for feeding air from the compressor to the expansion turbine, some of the air flowing through the normally open air flow path is fed into the air separating section through a branching flow path of the normally open flow path, the permeability for oxygen of the selectively permeable membrane is made higher than the permeability for nitrogen thereof, and oxygen-concentrated air passing through the selectively permeable membranes can be introduced into the cabin without passing through the expansion turbine. In this way, oxygen-concentrated air that has been reduced in pressure by passing through the selectively permeable membrane can be introduced into the cabin without passing through the expansion turbine, and air that has passed through the normally open flow path reduces the drop in pressure between the outlet of the compressor and the inlet of the expansion turbine, so lowered efficiency of the air cycle cooling device can be prevented.

Preferably there is provided a compressor for compressing prior to mixing by which the recirculation air is pressurized prior to the mixing with the extracted air. In this way, the recirculation air is pressurized to the same degree as the extracted air pressure prior to the mixing with the extracted air, so that backflow of the recirculation air is prevented and the mixing can be performed smoothly. The selectively permeable membrane of which the permeability for nitrogen is made higher than the permeability for oxygen can be utilized. In this case, preferably the oxygen-concentrated air is expanded by the expansion turbine, and the output of the expansion turbine is employed as power for driving at least one of the cooling device compressor and the compressor for compressing prior to mixing. In this way, the expansion work of the expansion turbine can be effectively utilized.

Furthermore, preferably the air conditioner is provided with an auxiliary extracted air flow path through which the extracted air flows and a changeover valve connected with this auxiliary extracted air flow path and the recirculation air flow path, upstream of the compressor for compressing prior to mixing, wherein the changeover valve is made capable of changing over between a first condition and a second condition, when the changeover valve is in the first condition, the recirculation air is fed to the compressor for compressing prior to mixing and the flow of the extracted air from the auxiliary extracted air flow path to the compressor for compressing prior to mixing is cut off, and when the changeover valve is in the second condition, the extracted air is fed from the auxiliary extracted air flow path to the compressor for compressing prior to mixing and the flow of the recirculation air is cut off. When the changeover valve is in the second condition, the extracted air is compressed by the compressor for compressing prior to mixing instead of the recirculation air and the auxiliary extracted air flow path is connected with the air flow path of the extracted air through the recirculation air flow path. In this way, when the pressure of the extracted air is extremely low, instead of supplying the extracted air directly into the cooling device, the extracted air compressed by the compressor for compressing prior to mixing can be supplied into the cooling device without supplying the recirculation air compressed by the compressor for compressing prior to mixing. In this way, it is desirable to put the changeover valve into the second condition for example in a condition in which the aircraft is descending. Specifically, when the aircraft is descending, the air capacity in the fuel tanks becomes large as a result of the fuel being used up and it is necessary to supply a large amount of nitrogen-enriched gas into the fuel peripheral region because of the increase in air pressure of outside fuselage produced by the descent. Consequently, the air pressure supplied to the cooling device should be a value such as to obtain a sufficient flow rate of nitrogen-enriched gas in the air separating section. As a result, during descent in which the extracted air pressure shows a considerable drop due to throttling of the engine output, it becomes difficult to supply the extracted air directly to the cooling device. Furthermore, during descent, the pressure of the extracted air is still often higher than the pressure of the recirculation air. Consequently, by compressing the extracted air by the compressor for compressing prior to mixing instead of the recirculation air, the energy required for operation of the compressor for compressing prior to mixing can be reduced in an amount corresponding to the difference of the pressure of the extracted air and the recirculation air. The power consumption of the equipment as a whole i.e. the energy consumption can thereby be further reduced.

It is further desirable that the compressor for compressing prior to mixing has a plurality of compression sections, and a mechanism capable of changing over between a condition in which at least two or more of the compression sections are connected in series and a condition in which they are connected in parallel is provided. In this case, preferably the plurality of compression sections are connected in series when the changeover valve is in the first condition and are connected in parallel when the changeover valve is in the second condition. In this way, if the compression ratio in each of the compression section of the compressor for compressing prior to mixing is made practically the same when the changeover valve is in the first condition and when it is in the second condition, the flow rate in the compressor for compressing prior to mixing at the time the changeover valve is in the second condition can be made greater than that at the time the changeover valve is in the first condition by a factor of about the number of the compression sections. In this way, increase in power consumption can be prevented by putting the changeover valve in the second condition in a condition where the aircraft is descending. There is therefore no need to increase the number of the compressor for compressing prior to mixing in order to guarantee the air flow rate when the aircraft is descending. Meanwhile, when the aircraft is descending, high propellant force is not needed and the capacity of the extracted air quantity is increased. Therefore, the second condition does not cause the increase load of the engine.

Preferably, at least one of the cooling device compressor and the compressor for compressing prior to mixing is supplied with at least part of the power necessary for its driving from a motor.

In this way, the difference obtained by subtracting the expansion work of the expansion turbine from the total of the compression work of the cooling device compressor and the compression work of the compressor for compressing prior to mixing can be made up by the power of the motor.

Preferably there is provided a vapor cycle heat exchanger unit of high COP (coefficient of performance) capable of cooling the recirculation air compressed by the compressor for compressing prior to mixing.

In this way, the temperature of the air supplied to the cabin can be suitably regulated with little input energy.

According to the present invention, an aircraft air conditioner can be provided that is capable of contributing to prevention of occurrence of fuel fires and comfort within the cabin is improved, by implementing OBIGGS in a civil aircraft by reducing the size and weight of the equipment, in which the rate and pressure of the air feed into the air separating unit can be guaranteed without increasing engine load.

DESCRIPTION OF THE PREFERRED EMBODIMENTS

Figure 1:
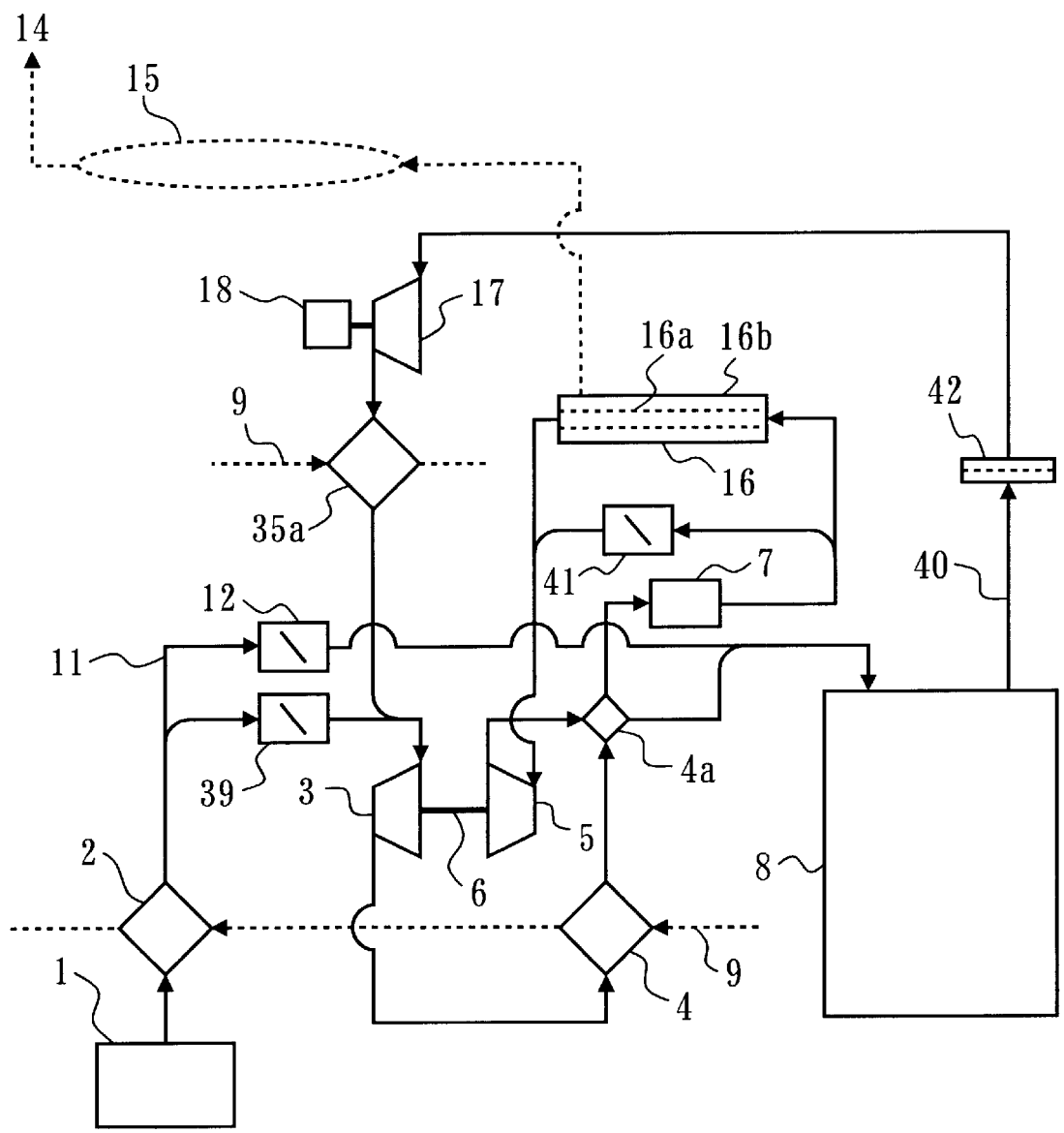
FIG. 1 is a layout diagram of an aircraft air conditioner according to a first embodiment of the present invention.

In the aircraft air conditioner of the first embodiment shown in FIG. 1, extracted air from an engine 1 is cooled by a heat exchanger called a pre-cooler 2 and adjusted in flow rate by a flow rate adjusting valve 39 before being practically adiabatically compressed by a radial compressor 3. The degree of opening of the flow rate control valve 39 can be regulated in accordance with a signal from a controller (not shown). The air that is thereby raised in temperature is cooled by a heat exchanger called main cooler 4 before being cooled in a regenerating heat exchanger 4*a*, and is fed to a water separator 7 for moisture capture. The extracted air that is fed to this water separator 7 is fed to an opening/closing valve 41 and an air separating section 16. The degree of opening of the opening/closing valve 41 is adjusted by means of a signal from the controller. The air that has not permeated through a selectively permeable membrane 16*a* of the air separating section 16 and the air flowing out from the opening/closing valve 41 are practically adiabatically expanded in an expansion turbine 5, and thus cooled air is obtained. This cooled air is fed into a cabin 8 including the cockpit space of the aircraft through the regenerating heat exchanger 4*a*. Cooling by external air passing through a ram air flow path 9 is performed in the pre-cooler 2 and main cooler 4. The expansion work of the expansion turbine 5 is utilized as compressive power by being transmitted to the compressor 3 through a shaft 6. When the engine is stopped at the aircraft on the ground, it is arranged to be possible to supply extracted air from a high-pressure air supply unit such as an APU, instead of the engine 1, to the air conditioner.

Furthermore, for heating of the cabin 8, a bypass air flow path 11 is provided for feeding the extracted air from the engine 1 to the cabin 8 without passing through the air cycle cooling device constituted by the compressor 3 and the expansion turbine 5. This bypass air flow path 11 is opened/closed by means of a hot air modulating valve 12. The air flow rate flowing through the bypass air flow path 11 can be adjusted by making the degree of opening of this hot-air modulating valve 12 adjustable by means of a signal from the controller. Some of the extracted air is fed into the bypass air flow path 11 by opening this hot-air modulating valve 12 without being cooled by the air cycle cooling device constituted by the compressor 3 and the expansion turbine 5. The extracted air that is fed to the bypass air flow path 11 is fed into the cabin 8. The air within the cabin 8 flows out through an outflow air flow path 40 in an amount corresponding to the difference, which is obtained by subtracting the amount discharged from an air flow path to outside the fuselage and the amount of leakage from the fuselage from the amount supplied from the air conditioner. Dust and odors are removed by means of a filter 42 in the outflow air flow path 40.

A recirculation air flow path through which air flowing out from the cabin 8 is returned to the cabin 8 is provided. In this way, the air flowing out from the cabin 8 becomes recirculation air returning into the cabin 8. The recirculation air flowing out from the cabin 8 via the outflow air flow path 40 is fed into a compressor 17 driven by a motor 18 for compressing prior to mixing. The recirculation air flow path and the flow path for the extracted air from the engine 1 are connected to each other such that the recirculation air that is returned to the cabin 8 after flowing out from cabin 8 is mixed with the extracted air. In this embodiment, the recirculation air that is raised in pressure by the compressor 17 for compressing prior to mixing is mixed with the extracted air supplied through the flow rate control valve 39, after being cooled by external air passing through the ram air flow path 9 in the heat exchanger 35*a*. This mixture of the recirculation air and the extracted air is fed into the air separating section 16 in accordance with the degree of opening of the opening/closing valve 41, after being practically adiabatically compressed by the compressor 3 of the air cycle cooling device.

Air separating section 16 in this embodiment is assumed to be of large processing capacity and suitable for a large aircraft. This air separating section 16 is constructed by covering a selectively permeable membrane 16*a* comprised of a large number of bundled hollow fibers with a housing 16*b* to generate nitrogen-enriched gas and oxygen-concentrated air. Consequently, the permeability of the selectively permeable membrane 16*a* for the nitrogen ($N_2$) and for the carbon dioxide ($CO_2$) in the air is higher than that for oxygen ($O_2$). In this way, the extracted air that has passed through the water separator 7 after being cooled by the regenerating heat exchanger 4*a* can be converted into nitrogen-enriched gas (in this embodiment of $N_2$=92% or more) by passing through the selectively permeable membrane 16*a*. This nitrogen-enriched gas is discharged to the space 14 outside the fuselage by passing through a discharge flow path after being fed to the fuel peripheral region 15 such as the interior of the fuel tank or fuel pipe setting region. The oxygen concentration of the air that has not passed through the selectively permeable membrane 16*a* is raised. This oxygen-concentrated air, whose oxygen concentration has been increased, is fed to the expansion turbine 5. The air flow rate passing through the selectively permeable membrane 16*a* can be adjusted by making the degree of opening of the opening/closing valve 41 adjustable by means of a signal from the controller. The outside of the selectively permeable membrane 16*a* is of practically the same pressure as the pressure outside the fuselage, like fuel peripheral region 15.

According to the embodiment described above, the oxygen-concentrated air from which nitrogen is separated by the air separating section 16 is effectively utilized by being returned to the cabin 8. Also, when both the air cycle cooling device and the air separating section 16 are functioning, increase in the amount of air extracted from the engine 1 is suppressed so that the load on engine 1 can be reduced. By the compressor 3 of this air cycle cooling device, the pressure of the mixture of the recirculation air and the extracted air can be raised to the pressure needed for separating the air constituents by the selectively permeable membrane 16*a* of air separating section 16. Also, the recirculation air is pressurized to about the same pressure as the pressure of the extracted air by the compressor 17 prior to the mixing with the extracted air, so that backflow of the recirculation air can be prevented and the mixing can be performed in a smooth fashion. The output of the expansion turbine 5 is employed as power for driving the compressor 3 when the oxygen-concentrated air is expanded by the expansion turbine 5. The expansion work of the expansion turbine 5 can thereby be effectively utilized. Since the compressor 17 for compressing prior to mixing is supplied with the necessary power for driving from the motor 18, the difference obtained by subtracting the expansion work of the expansion turbine 5 from the total of compressive work of the compressor 3 of the cooling device and the compressive work of the compressor 17 can be made up by the power of this motor 18.

Figure 2:
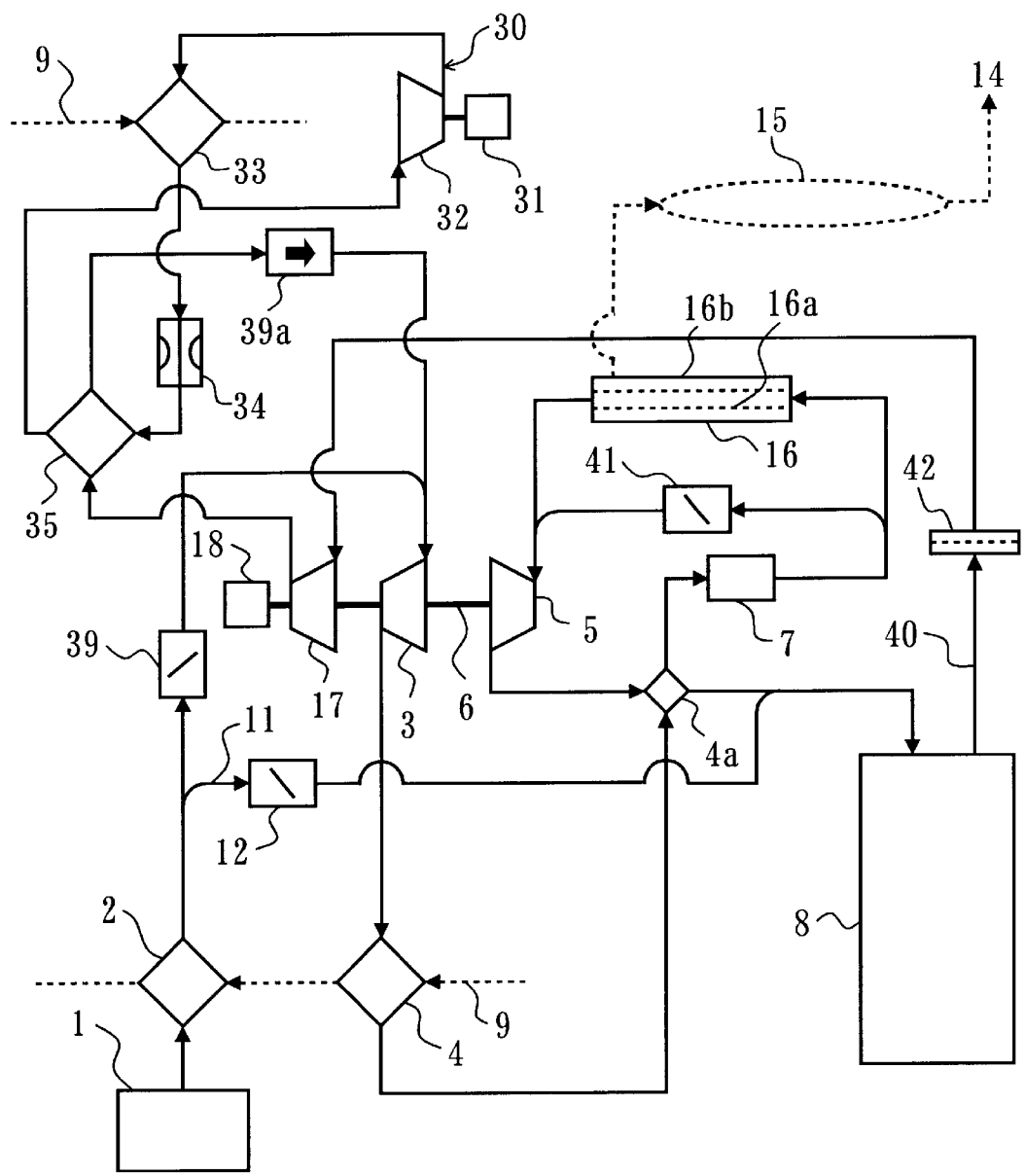
FIG. 2 is a layout diagram of an aircraft air conditioner according to a second embodiment of the present invention.

FIG. 2 shows an aircraft air conditioner according to a second embodiment of the present invention. Portions which are different from the first embodiment are described, and same portions as in the case of the first embodiment are given the same reference symbols.

In this second embodiment, the compressor 17 driven by the motor 18 for compressing prior to mixing is rotated integrally with the compressor 3 of the air cycle cooling device and the expansion turbine 5. In this way, this motor 18 is employed as an auxiliary drive source. Also, a vapor cycle heat exchanger unit 30 is provided instead of the heat exchanger 35*a*. The recirculation air that is raised in pressure by the compressor 17 is fed to the air cycle cooling device through a check valve 39*a* after being cooled by an evaporator 35 of the heat exchanger unit 30, and is thereby mixed with the extracted air supplied through the flow rate control valve 39. This check valve 39*a* prevents the extracted air from the engine 1 from flowing back before the recirculation air is sufficiently pressurized by the compressor 17. The heat exchanger unit 30 is constituted by a cooling cycle using a coolant such as HFC134a. Specifically, this coolant is compressed by a compressor 32 driven by a motor 31 and condensed in a condenser 33 by discharge of its heat to the air outside the fuselage passing through the ram air flow path 9. The temperature of this condensed coolant is lowered by pressure reduction in an expansion valve 34. The coolant that is thus brought to a low temperature is evaporated by absorption of heat from the air as described above in the evaporator 35. By adopting the vapor cycle heat exchanger unit 30, a high energy consumption efficiency (or COP) can be achieved, so a large quantity of heat can be discharged by a small amount of energy. Other details are the same as in the case of the first embodiment.

With this second embodiment, the same benefits as in the case of the first embodiment can be presented. Furthermore, by cooling the recirculation air by means of the vapor cycle heat exchanger unit 30, the temperature of the air that is supplied to the cabin 8 can be appropriately regulated. Since the output of the expansion turbine 5 is employed as power for driving the compressor 3 and the compressor 17 for compressing prior to mixing, the expansion work of the expansion turbine 5 can be effectively utilized. Since the power that is necessary for drive of the compressor 3 and the compressor 17 for compressing prior to mixing is supplied from the motor 18, the difference obtained by subtracting the expansion work of the expansion turbine 5 from the total of the compression work of the compressor 3 and the compression work of the compressor 17 for compressing prior to mixing can be made up by the power of the motor 18.

Figure 3:
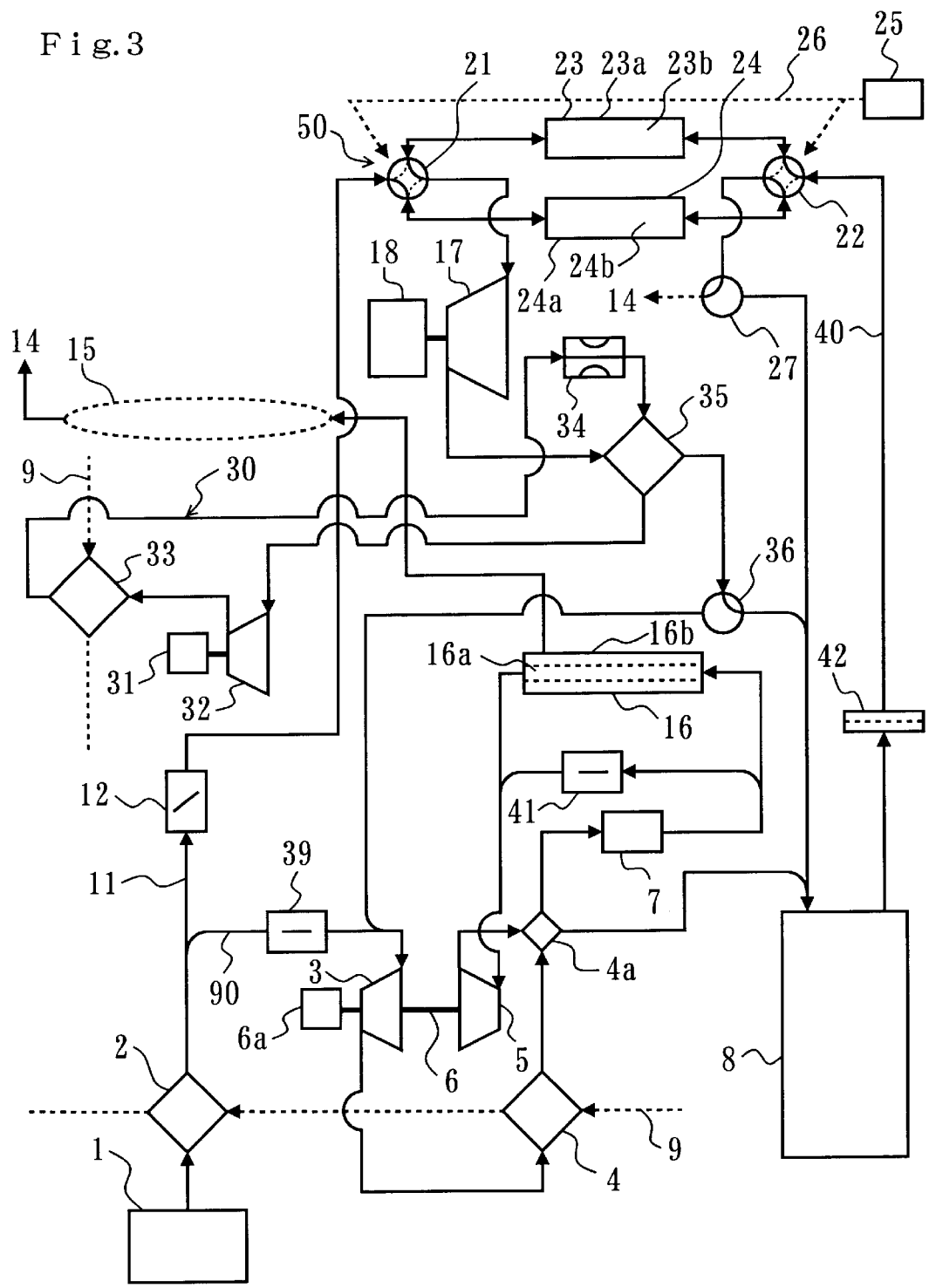
FIG. 3 is a layout diagram of an aircraft air conditioner according to a third embodiment of the present invention when the aircraft is on the ground.
Figure 4:
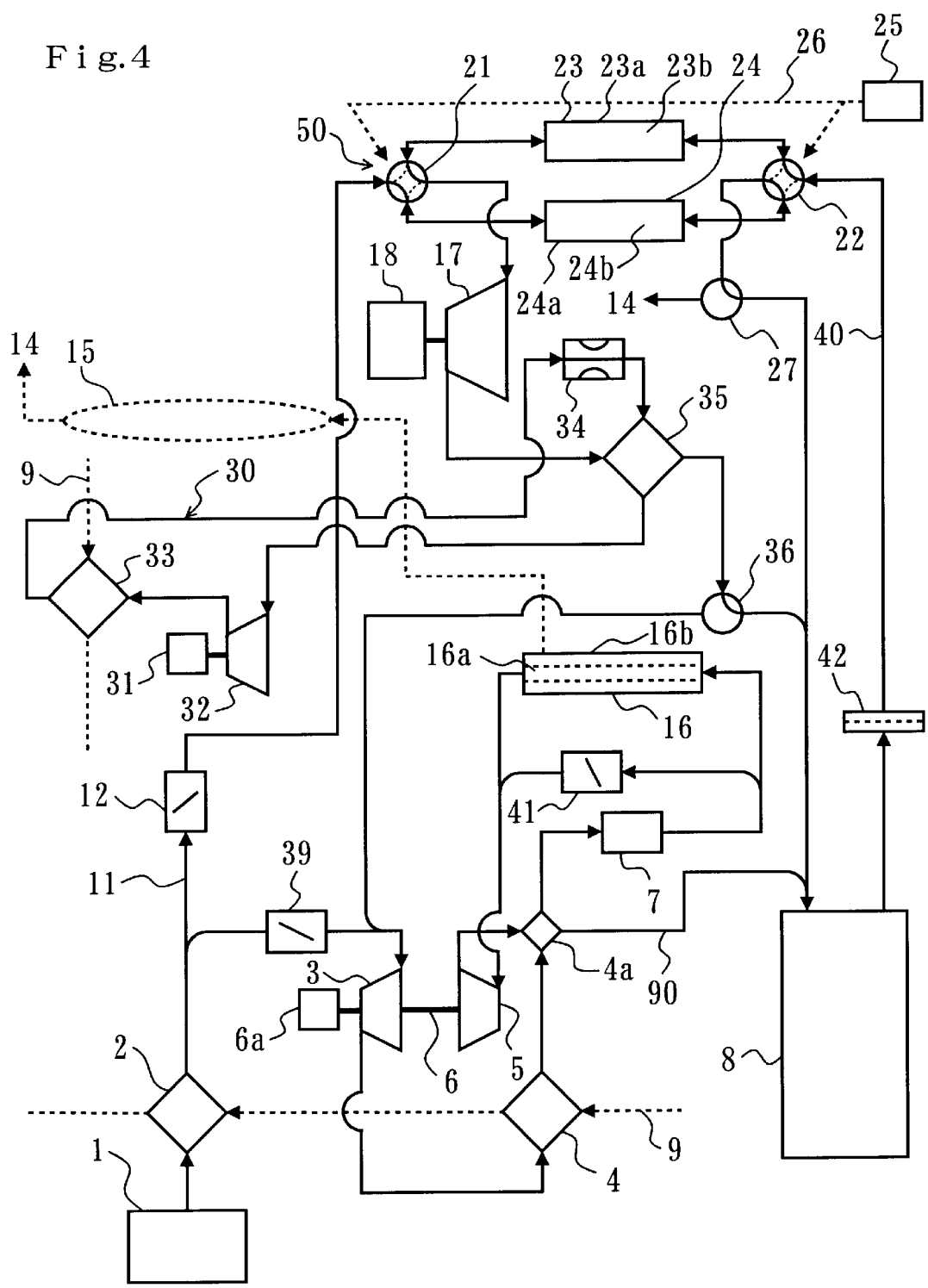
FIG. 4 is a layout diagram of an aircraft air conditioner according to the third embodiment of the present invention when the aircraft is climbing.
Figure 5:
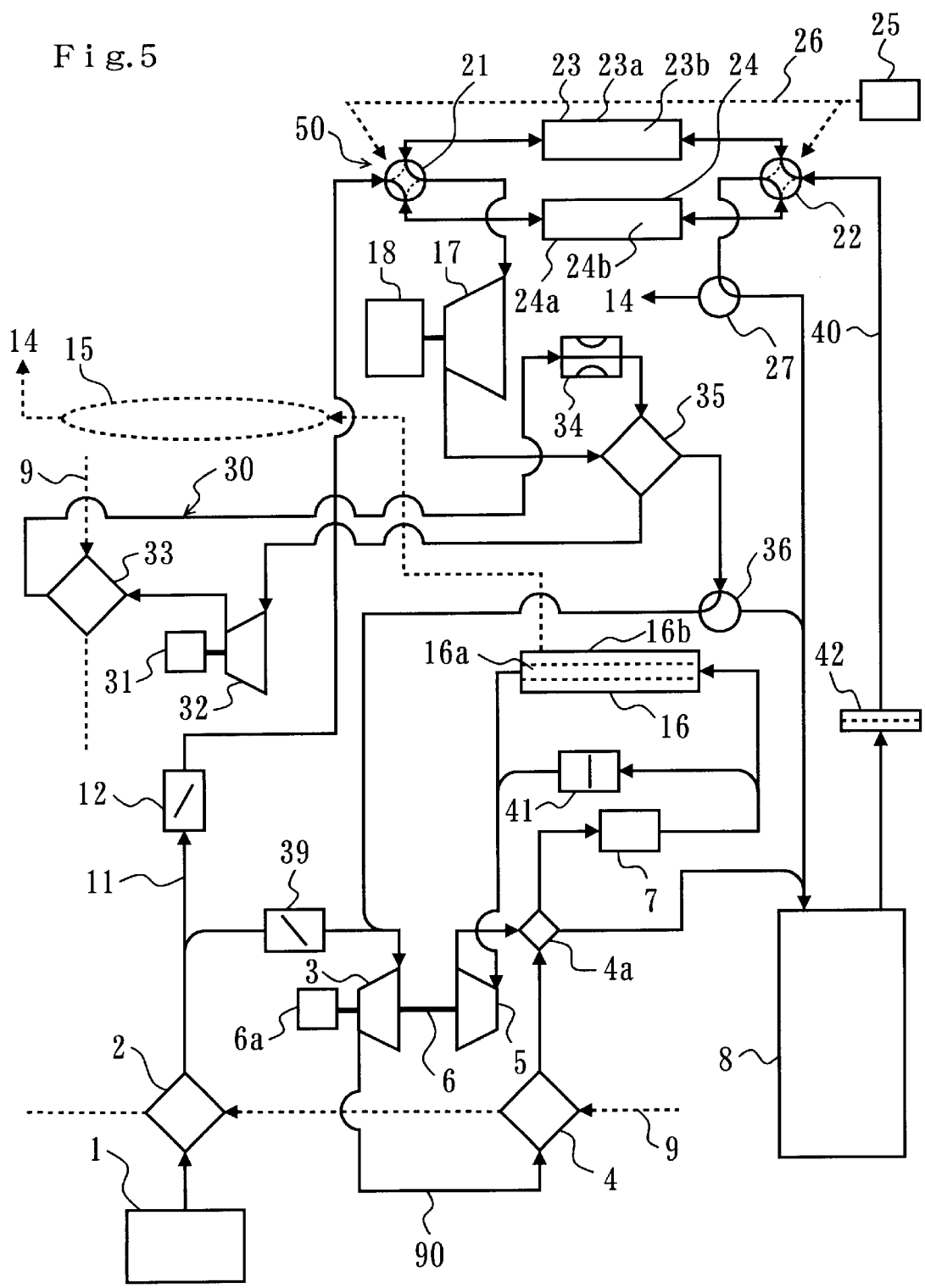
FIG. 5 is a layout diagram of an aircraft air conditioner according to the third embodiment of the present invention when the aircraft is cruising at high altitude.
Figure 6:
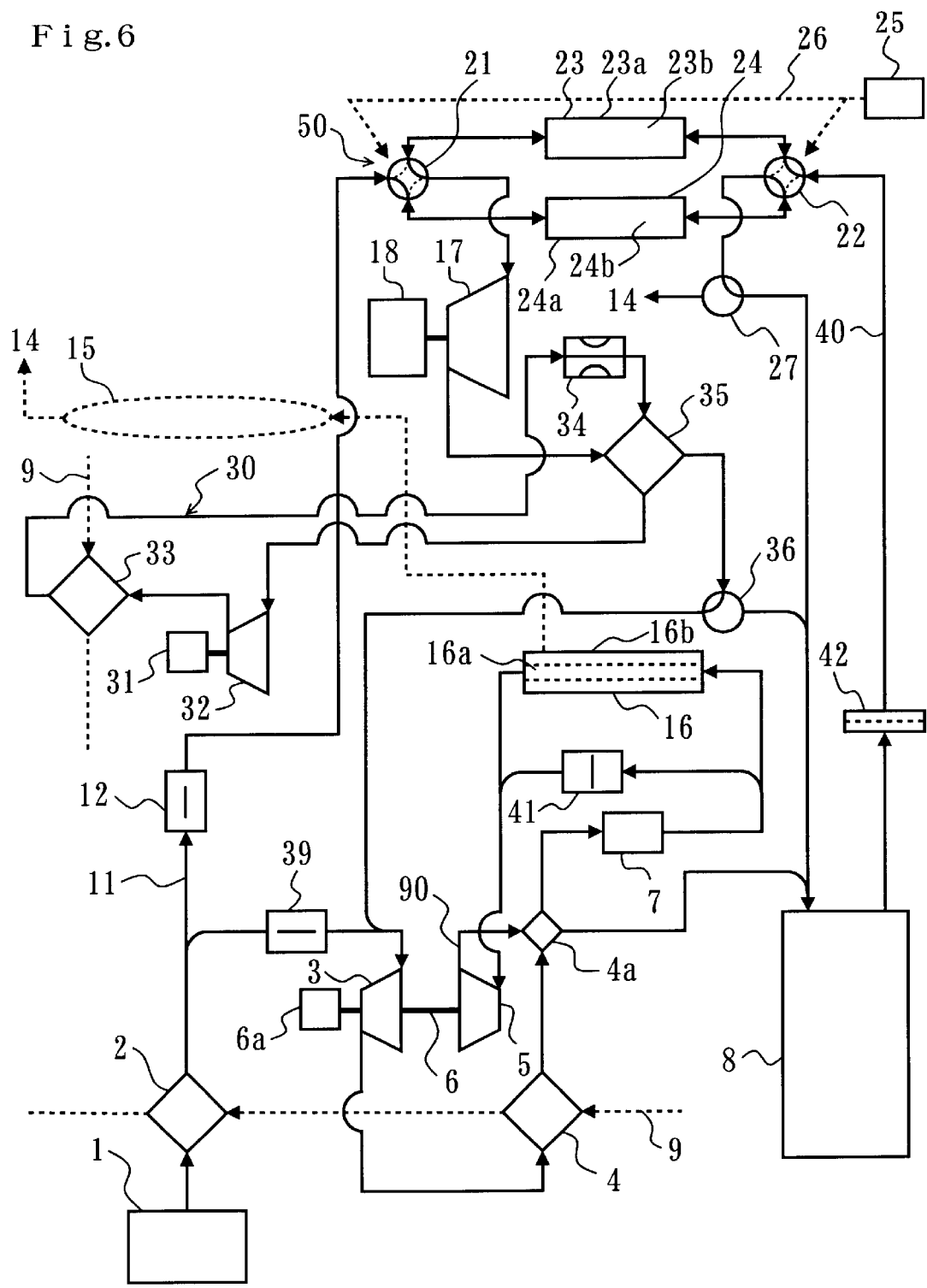
FIG. 6 is a layout diagram of an aircraft air conditioner according to the third embodiment of the present invention when the aircraft is descending.

FIG. 3 to FIG. 6 illustrate an aircraft air conditioner according to a third embodiment of the present invention. Parts which are the same as in the first embodiment are shown with the same reference symbols and the points of difference are described. FIG. 3 shows the condition when the aircraft is on the ground, FIG. 4 shows the condition when it is climbing after take-off, FIG. 5 shows the condition of cruising at high altitude and FIG. 6 shows the condition when descending.

In the aircraft air conditioner of this embodiment, air extracted from the engine 1 is cooled by a heat exchanger called a pre-cooler 2 and is compressed practically adiabatically by a radial compressor 3 after adjustment of the flow rate by a flow rate control valve 39. The degree of opening of this flow rate control valve 39 can be adjusted by means of a signal from a controller 25. The air which has thereby been raised in temperature is cooled by a heat exchanger called a main cooler 4 then cooled by a regenerating heat exchanger 4a and fed to a water separator 7 for moisture capture. The extracted air fed to this water separator 7 is fed to an opening/closing valve 41 and an air separating section 16. The degree of opening of this opening/closing valve 41 is adjusted by means of a signal from the controller 25. The air remaining in this air separating section 16 without passing through the selectively permeable membrane 16a and the air flowing out from this opening/closing valve 41 are practically adiabatically expanded by an expansion turbine 5, and cooled air is thereby obtained. This cooled air is fed into a cabin 8 including a cockpit space of the aircraft through a regenerating heat exchanger 4a. Cooling by external air passing through a ram air flow path 9 is performed in the pre-cooler 2 and main cooler 4. The expansion work of the expansion turbine 5 is utilized as compressive power by being transmitted to the compressor 3 through a shaft 6. A motor 6a for supplementing the necessary power for driving the compressor 3 is mounted on the shaft 6 connecting the compressor 3 with the turbine 5. When the aircraft descends, the pressure of the extracted air from the engine 1 is low, so pressurization can be effected up to the pressure that is appropriate for the air separating section 16 by the power assistance provided by the motor 6a.

It is arranged that when the engine is stopped with the aircraft on the ground, extracted air from a pressurized air supply unit such as an APU instead of the engine 1 can be supplied to the air conditioner.

A bypass air flow path 11 is provided for feeding extracted air from the engine 1 to the cabin 8 without passing through the air cycle cooling device. This bypass air flow path 11 is opened/closed by means of a hot air modulating valve 12. The degree of opening of this hot-air modulating valve 12 is made adjustable by means of a signal from the controller 25. In this way, the flow rate of the air flowing through the bypass air flow path 11 can be adjusted. Some of the extracted air is fed into the bypass air flow path 11 by opening the hot-air modulating valve 12, without being cooled by the air cycle cooling device constituted by the compressor 3 and expansion turbine 5. The air within the cabin 8 flows out through an outflow air flow path 40 in an amount corresponding to the difference, which is obtained by subtracting the amount discharged from an air flow path to outside the fuselage and the amount of leakage from the fuselage from the amount supplied by the air conditioner. In the outflow air flow path 40, dust and odors are removed from the air by means of a filter 42.

A first adsorption section 23 and a second adsorption section 24 are connected to the bypass air flow path 11 and the outflow air flow path 40 through an air flow path changeover mechanism 50. The air flow path changeover mechanism 50 of this embodiment comprises a first changeover valve 21 and a second changeover valve 22. Each of the adsorption section 23, 24 is provided with adsorption agent 23b, 24b packed in a container 23a, 24a. Each adsorption agent 23b, 24b adsorbs molecules contained in the air and releases the adsorbed molecules by being raised in temperature to more than the temperature on adsorption. For example, the adsorption sections 23, 24 can be constituted of a water molecule adsorbing substance such as silica gel and/or an oxygen molecule adsorbing substance such as zeolite. In this embodiment, water molecule adsorption substance is used as the adsorption agent 23b, 24b.

By means of the air flow path changeover mechanism 50, each of the adsorption sections 23, 24 is made to be capable of being changed over between a condition connected to the bypass air flow path 11 and a condition connected to the outflow air flow path 40. In this embodiment, the bypass air flow path 11 is alternately connected with the first adsorption section 23 and the second adsorption section 24 so that the extracted air flowing through the bypass air flow path 11 passes alternately through the first adsorption section 23 and the second adsorption section 24. Also, the outflow air flow path 40 is alternately connected with the first adsorption section 23 and the second adsorption section 24 so that the air flowing through the outflow air flow path 40 is alternately passed through the first adsorption section 23 and the second adsorption section 24.

The first changeover valve 21 is changed over between a first condition shown by broken lines in the figure and a second condition shown by solid lines in the figure. In the first condition, air fed to the bypass air flow path 11 from the engine 1 is fed to the first adsorption section 23, and air flowing out from the second adsorption section 24 is fed to a compressor 17 for compressing prior to mixing. In this second condition, air that is fed to the bypass air flow path 11 from the engine 1 is fed to the second adsorption section 24, and air that flows out from the first adsorption section 23 is fed to the compressor 17.

The second changeover valve 22 is changed over between a first condition indicated by broken lines in the figure and a second condition indicated by solid lines in the figure. In this first condition, air flowing out from the first adsorption section 23 is fed to a third changeover valve 27, and air flowing out from the cabin 8 is fed to the second adsorption section 24. In this second condition, air flowing out from the second adsorption section 24 is fed to the third changeover valve 27 and air flowing out from the cabin 8 is fed to the first adsorption section 23.

The air flow path changeover mechanism 50 is controlled by the controller 25 mounted on the aircraft. By means of this control, each of the adsorption sections 23 and 24 is changed over between a condition connected to the bypass air flow path 11 and a condition connected to the outflow air flow path 40. That is, the two changeover valves 21 and 22 are changed over between the first condition and second condition by means of changeover signals sent at set time intervals set by means of an incorporated timer or the like in the controller 25. When the first changeover valve 21 is in the first condition, the second changeover valve 22 is in the first condition. When the first changeover valve 21 is in the second condition, the second changeover valve 22 is in the second condition. Specifically, the air flow path changeover mechanism 50 is controlled such that, when the extracted air flowing in the bypass air flow path 11 passes through one of the two adsorption sections 23, 24, the air flowing in the outflow air flow path 40 passes through the other of the two adsorption sections 23, 24, and when the extracted air flowing in the bypass air flow path 11 passes through the other of the two adsorption sections 23, 24, the air flowing in the outflow air flow path 40 passes through the aforementioned one of the two adsorption sections 23, 24.

In this way, after being fed to one or other of the two adsorption sections 23, 24 through the first changeover valve 21, the extracted air that is fed to the bypass air flow path 11 by opening of the hot-air modulating valve 12 is fed to the second changeover valve 22. The air that is fed to the second changeover valve 22 from the adsorption sections 23, 24 is fed to the third changeover valve 27. The third changeover valve 27 is capable of changing over the air flow path between a condition in which the air that is fed thereto is released to the space 14 outside the fuselage and a condition in which it is fed to the cabin 8, under the control of a signal from the controller 25.

The air flowing out from the cabin 8 to the outflow air flow path 40 is fed to one or other of the two adsorption sections 23, 24 from the second changeover valve 22, and is then fed to the compressor 17 driven by the motor 18. The air that has been raised in pressure by the compressor 17 is cooled by an evaporator 35 of a vapor cycle heat exchanger unit 30 before being fed to a fourth changeover valve 36. The fourth changeover valve 36 is capable of changing over the air flow path between a condition in which the air that is fed thereto is fed to the cabin 8 and a condition in which it is fed to the air cycle cooling device, under the control of a signal from the controller 25. The heat exchanger unit 30 is constituted by a cooling cycle using a refrigerant such as HFC134a. Specifically, the refrigerant is compressed by a compressor 32 driven by a motor 31 and condensed in a condenser 33 by discharge of its heat to the air outside the fuselage through the ram air flow path 9. The temperature of the compressed refrigerant is lowered by pressure reduction with an expansion valve 34. The refrigerant that has thus been brought to a low temperature is evaporated by adsorption of heat from the air as described above in the evaporator 35.

A recirculation air flow path is constituted so that air flowing out through the outflow air flow path 40 from the cabin 8 is returned to the cabin 8 through the fourth changeover valve 36. Specifically, the fourth changeover valve 36 effects changeover between the case where air flowing out from the cabin 8 is returned directly to the cabin 8 and the case where the air is returned to the cabin 8 through the air cycle cooling device. In this way, the air flowing out from the cabin 8 becomes recirculation air that returns to the cabin 8. This recirculation air flow path and the air flow path of the extracted air from the engine 1 are connected to each other so that the recirculation air that is returned to the cabin 8 after flowing out from the cabin 8 is mixed with the extracted air. In this embodiment, the recirculation air that is fed to the air cycle cooling device through the fourth changeover valve 36 is mixed with the extracted air supplied through the flow rate control valve 39. This mixture of the recirculation air and the extracted air is fed into the air separating section 16 after being practically adiabatically compressed by the compressor 3 of the air cycle cooling device.

The temperature of the extracted air fed into the bypass air flow path 11 through the pre-cooler 2 from the engine 1 is 100° C. to 140° C., and the temperature of the air fed into the outflow air flow path 40 from the cabin 8 is 20° C. to 30° C. In this way, the adsorption agent 23b, 24b adsorbs active constituents (in this case water molecules) contained in the air flowing out from the cabin 8, when its temperature is lowered by the air flowing out from the cabin 8 and passing through therein. The adsorption agent 23b, 24b releases the water molecules adsorbed from the air flowing out from the cabin 8 into the extracted air and is thus regenerated, when its temperature is heightened by the extracted air flowing out from the engine 1 and passing through therein. For example, if the adsorption agent 23b, 24b is silica gel, 1.0 kg of silica gel can adsorb 0.25 kg or more of water molecules at 20° C., but 1.0 kg of silica gel can only adsorb 0.02 kg or less of water molecules at 100° C. In this way, water molecules in the air flowing out from the cabin 8 are adsorbed by the adsorption agent 23b, 24b and returned to the cabin 8 by being released into the air extracted from the engine 1, thereby improving the comfort of the cabin 8. In addition, the adsorption agent 23b, 24b is regenerated so that it can be used again. If zeolite, which functions as an oxygen molecule adsorbing substance, is employed for the adsorption agent 23b, 24b, the oxygen molecules in the air flowing out from the cabin 8 are adsorbed by the adsorption agent 23b, 24b and returned to the cabin 8 by being released into the air extracted from the engine 1, thereby improving comfort of the cabin 8. In addition, the adsorption agent 23b, 24b is regenerated so that it can be re-used. Also, comfort of the cabin 8 can be even further improved by constituting the adsorption sections 23, 24 both of adsorption agent that can adsorb water molecules and adsorption agent that can adsorb oxygen molecules, thereby enabling both moisture and oxygen to be adsorbed. In this case, preferably silica gel and zeolite are arranged in alternate layer fashion.

The air separating section 16 in this embodiment is assumed to be of large processing capacity and suitable for a large aircraft. This air separating section 16 is constructed by covering a selectively permeable membrane 16a comprised of a large number of bundled hollow fibers with a housing 16b to generate nitrogen-enriched gas and oxygen-concentrated air. Consequently, the permeability of the selectively permeable membrane 16a for the nitrogen ($N_2$) and for the carbon dioxide ($CO_2$) in the air is higher than that for oxygen ($O_2$). In this way, the extracted air that has passed through the water separator 7 after being cooled by the regenerating heat exchanger 4a can be converted into nitrogen-enriched gas (in this embodiment of $N_2$=92% or more) by passing through the selectively permeable membrane 16a. This nitrogen-enriched gas is discharged to the space 14 outside the fuselage by passing through a discharge flow path after being fed to the fuel peripheral region 15 such as the interior of the fuel tank or fuel pipe setup region. The oxygen concentration of the air that has not passed through the selectively permeable membrane 16a is raised. This oxygen-concentrated air, whose oxygen concentration has been increased, is fed to the expansion turbine 5. The air flow rate passing through the selectively permeable membrane 16a can be adjusted by making the degree of opening of the opening/closing valve 41 adjustable by means of a signal from the controller 25. The outside of the selectively permeable membrane 16a is of practically the same pressure as the pressure outside the fuselage, like fuel peripheral region 15.

In the cooling condition on the ground shown in FIG. 3, the air cycle cooling device constituted by the compressor 3 and expansion turbine 5 can be fully actuated by putting the flow rate control valve 39 in open condition.

In this case, the degree of opening of the opening/closing valve 41 can be selected as required. Specifically, by fully opening the opening/closing valve 41, arrangement can be made such that air is not introduced into the air separating section 16. This can therefore be associated with the case in which additional supply of nitrogen-enriched gas to the fuel peripheral region 15 is unnecessary, since the empty volume in the interior of the fuel tank becomes small because of fuel being loaded on the ground, there is no change in atmospheric pressure, and fuel consumption is minimal even including taxiing.

Alternatively, by closing the opening/closing valve 41, air can be introduced into the air separating section 16. In this way, safety can be improved by diluting the fuel gas evaporated from the fuel tank with nitrogen-enriched gas supplied from the air separating section 16 whilst the aircraft is in standby on the ground.

When there is high temperature and high humidity on the ground, moisture in the air can be released to outside the fuselage by closing the opening/closing valve 41, because the moisture permeability of the selectively permeable membrane 16a is high. In this way, the moisture in the air introduced into the expansion turbine 5 is reduced and the generation of heat of condensation is reduced, so that the cooling capacity can be increased and the humidity in the cabin 8 can be reduced.

Also, in cooling conditions on the ground at high temperature and high humidity, regeneration of the adsorption agent 23b, 24b can be performed by opening the hot-air modulating valve 12 somewhat. Air containing a lot of moisture that is used for this regeneration is discharged to the space 14 outside the fuselage through the third changeover valve 27. In this way, in the case of cooling on the ground, the moisture within the cabin 8 is captured and discharged by the adsorption sections 23, 24, so comfort can be improved by suppressing the rise of humidity within the cabin 8 and furthermore lowering of the cabin cooling capacity can be prevented by preventing dew formation in the evaporator 35 of the heat exchanger unit 30. Full actuation of the heat exchanger unit 30 can thereby be permitted, whereby the cooling capacity of the cabin 8 is increased in combination with the air cycle cooling device. Also, the moisture-expelled air flowing out from the adsorption sections 23, 24 after flowing out from the cabin 8 is made flow back to the cabin 8 from the fourth changeover valve 36.

In the condition shown in FIG. 4 in which the aircraft has taken off and is climbing, the output of the engine 1 is raised, so the pressure of the extracted air becomes high. Consequently, the expansion ratio in the turbine 5 of the air cycle cooling device becomes large and therefore lower temperature air is supplied. In this case, it is necessary to prevent excessive lowering of the temperature within the cabin 8 by the air supplied from the air cycle cooling device. Also, in the condition in which the aircraft is climbing, the temperature of the external air and its water vapor content are rapidly falling, so it is necessary to prevent excess drop of humidity within the cabin 8. Consequently, the warm extracted air containing water vapor regenerated in the adsorption sections 23, 24 is supplied to the cabin 8 through the third changeover valve 27. Also, by making the heat exchanger unit 30 behave in accordance with conditions during ascent of the aircraft, the moisture-removed air flowing out from the adsorption sections 23, 24 after flowing out from the cabin 8 is made to flow back to the cabin 8 from the changeover valve 36, so the cabin 8 is maintained at the appropriate temperature and humidity.

Also, in climbing conditions, by gradually throttling the degree of opening of the opening/closing valve 41, the air that is supplied to the air separating section 16 is gradually increased. In this way, nitrogen-enriched gas is supplied from the air separating section 16 to the fuel peripheral region 15 in an amount in accordance with the fuel consumption. Furthermore, since the pressure of supply of the extracted air is high, if the expansion energy of the expansion turbine 5 is considerably higher than the compression work of the compressor 3, energy recovery by making motor 6a function as a generator is also possible.

In the condition when cruising at high altitude shown in FIG. 5, the moisture-removed air flowing out from the adsorption sections 23, 24 after flowing out from the cabin 8 is fed to the compressor 3 from the changeover valve 36 after being increased in pressure by the compressor 17. In this way, the rate of air fed into the air cycle cooling device and the air separating section 16 can be guaranteed, even if the rate of air extraction from the engine 1 is reduced after completion of ascent by throttling the output of engine 1. At this point, the opening/closing valve 41 is throttled considerably. Oxygen-concentrated air from the air separating section 16 is fed to the expansion turbine 5. In addition, air whose humidity has been increased in the adsorption sections 23, 24 is fed to the cabin 8 from the third changeover valve 27. In this way, the rate of air supply to the cabin 8 is guaranteed, so lowering of oxygen partial pressure within the cabin 8 is prevented and furthermore comfort can be maintained by maintaining the humidity. Also, nitrogen-enriched gas from the air separating section 16 is supplied to the fuel peripheral region 15.

Preferably, since the air outside the fuselage is at low temperature when cruising at high altitude, a valve that throttles the air outside the fuselage flowing into the heat exchangers 2, 4 or a flow path changeover valve with a bypass flow path for allowing the air outside the fuselage to bypass the heat exchangers 2, 4 is provided in the ram air path.

In the condition shown in FIG. 6 in which the aircraft is descending, the empty volume in the interior of the fuel tank becomes large as a result of consumption of fuel and atmospheric pressure rises due to the descent, so supply of a large quantity of nitrogen-enriched gas to the fuel peripheral region 15 is necessary. Furthermore, since the output of the engine 1 is severely throttled during descent, pressure of the extracted air supplied to the air cycle cooling device is low, making it difficult to ensure the rate of air extraction. Accordingly, the drop in the rate of air extraction in the air cooling device is made up by increasing the rate of supply of the recirculation air by feeding air flowing out from the cabin 8 to the compressor 3 via the changeover valve 36. Also, nitrogen enriched gas is supplied from the air separating section 16 to the fuel peripheral region 15 by fully closing the opening/closing valve 41. In addition, drop in the rate of air supply to the cabin 8 is prevented by feeding air humidified in the adsorption sections 23, 24 from the third changeover valve 27 to the cabin 8. In this case, the temperature of the cabin 8 is regulated by operating the heat exchanger unit 30 so that excessive heating is not applied to the cabin 8.

According to the third embodiment described above, necessary constituent molecules contained in the air flowing out from the cabin 8 can be returned into the cabin 8. Also, the adsorption agent 23b, 24b is regenerated so that these molecules in the air can again be adsorbed. The adsorption and release of water molecules by the adsorption agent 23b, 24b contribute to maintaining humidity within the cabin 8. If oxygen molecules are adsorbed and released by the adsorption agent 23b, 24b, this can contribute to maintaining the oxygen concentration in the cabin 8. Furthermore, regeneration of the air within the cabin 8 can be achieved by a straightforward construction merely involving addition of the adsorption sections 23, 24 and the air flow path changeover mechanism 50. The air flow rate flowing through the bypass air flow path 11 is made adjustable, so that it is possible to maintain an appropriate temperature within the cabin 8 by adjusting the ratio of the rate of air fed into the cabin 8 after cooling by the air cycle cooling device to the rate of air fed into the cabin 8 without such cooling.

Also, it is possible to prevent occurrence of fuel fires by the nitrogen-enriched gas separated by the selectively permeable membrane 16a. The oxygen-concentrated air separated by the selectively permeable membrane 16a contributes to maintaining the oxygen concentration within the cabin 8 (i.e. the oxygen partial pressure is maintained at the level on the ground even though the atmospheric pressure within the aircraft has become a pressure lower than that on the ground). At least water molecules in the air flowing out from the cabin 8 through the outflow air flow path 40 is adsorbed by the adsorption agent 23b, 24b. After passing through the adsorption sections 23, 24, the air flowing out from the cabin 8 is compressed by the compressor 17 and is furthermore raised in pressure by the compressor 3, before being supplied to the selectively permeable membrane 16a of the air separating section 16. In this way, the air flowing out from the cabin 8 can be again fed into the cabin 8 as oxygen-concentrated air, so the necessary air flow rate to control the pressure within the cabin 8 can be ensured without increasing the rate of air extraction from the engine 1. Also, nitrogen-enriched gas can be efficiently obtained by compressing the air fed to the selectively permeable membrane 16a. Furthermore, when the rate of air extraction from the engine 1, the temperature, the humidity, the oxygen concentration and/or the pressure of the external air change in accordance with the flying conditions of the aircraft, the temperature, humidity, oxygen concentration and pressure within the cabin 8 can be optimally maintained. In addition, when the extracted air containing the moisture released from the adsorption agent 23b, 24b is excessively humid, dew formation of the air cycle cooling device can also be prevented by releasing it to the space 14 outside the fuselage.

According to the third embodiment described above, the oxygen-concentrated air from which nitrogen is separated by the air separating section 16 can be effectively utilized by being returned to the cabin 8. Also, when both the air cycle cooling device and the air separating section 16 are functioning, the load on engine 1 can be reduced by suppressing increase of the rate of air extraction from the engine 1. By utilizing the compressor 3 of the air cycle cooling device, the pressure of the mixture of the recirculation air and the extracted air can be increased up to the pressure needed for separating the air constituents by the selectively permeable membrane 16a of the air separating section 16. Also, the recirculation air is pressurized to about the same pressure as the pressure of the extracted air by the compressor 17 prior to the mixing with the extracted air, so that backflow of the recirculation air can be prevented and the mixing performed in a smooth manner. When the oxygen-concentrated air is expanded by the expansion turbine 5, the output of this expansion turbine 5 is employed as power for driving the compressor 3. The expansion work of the expansion turbine 5 can thereby be effectively utilized. Since the compressor 3 and the compressor 17 for compressing prior to mixing are supplied with the necessary power for driving from the motors 6a and 18, the difference obtained by subtracting the expansion work of the expansion turbine 5 from the total of compressive work of the compressor 3 of the cooling device and the compressive work of the compressor 17 can be made up by the power of these motors 6a, 18. In addition, the temperature of the air supplied to the cabin 8 can be suitably adjusted by cooling the recirculation air by the vapor cycle heat exchanger unit 30.

Figure 7:
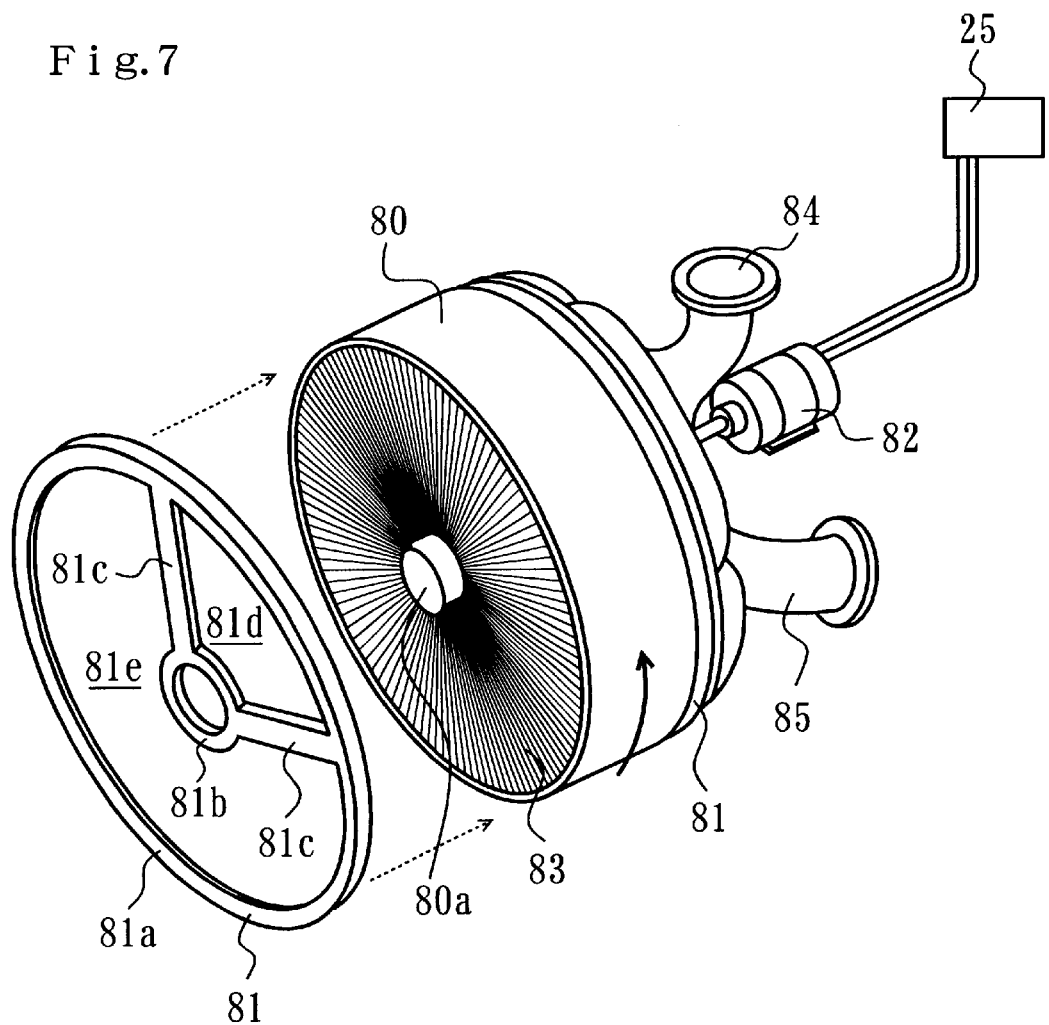
FIG. 7 is a layout diagram of an adsorption section in an aircraft air conditioner according to a modified example of the present invention.

FIG. 7 shows a modified example of the adsorption sections and air flow path changeover mechanism. In this modified example, a large number of adsorption sections 83 extending in the direction of the axis of rotation are provided in honeycomb fashion in the interior of a rotary drum 80. Adsorption agent such as silica gel is packed within the adsorption sections 83. Separators 81 are joined in relatively rotatable fashion via sealing members (not shown) at both end faces of this rotary drum 80. Each separator 81 is constituted by connecting an outer ring 81a with inner ring 81b via two arms 81c, and is fixed to the fuselage member of the aircraft. The central shaft 80a of the rotary drum 80 is rotatably supported via bearings (not shown) by the inner ring 81b of each of the separator 81. A motor 82 is connected with this central shaft 88, and the rotary drum 80 is rotated by this motor 82 being driven in response to a signal from the controller 25. Two regions 81d, 81e are defined by the two arms 81c between the outer ring 81a and inner ring 81b in each of the separators 81. One region 81d in each of the separators 81 is connected with the bypass air flow path 11 through a piping joint 84, while the other region 81e is connected with the outflow air flow path 40 through piping joint 85. In this way, an air flow path changeover mechanism is constituted wherein changeover is effected by rotation of this rotary drum 80 between a condition in which the adsorption sections 83 are connected with the bypass air flow path 11 and a condition in which they are connected with the outflow air flow path 40. Other details are the same as in the case of the embodiments described above.

Figure 8:
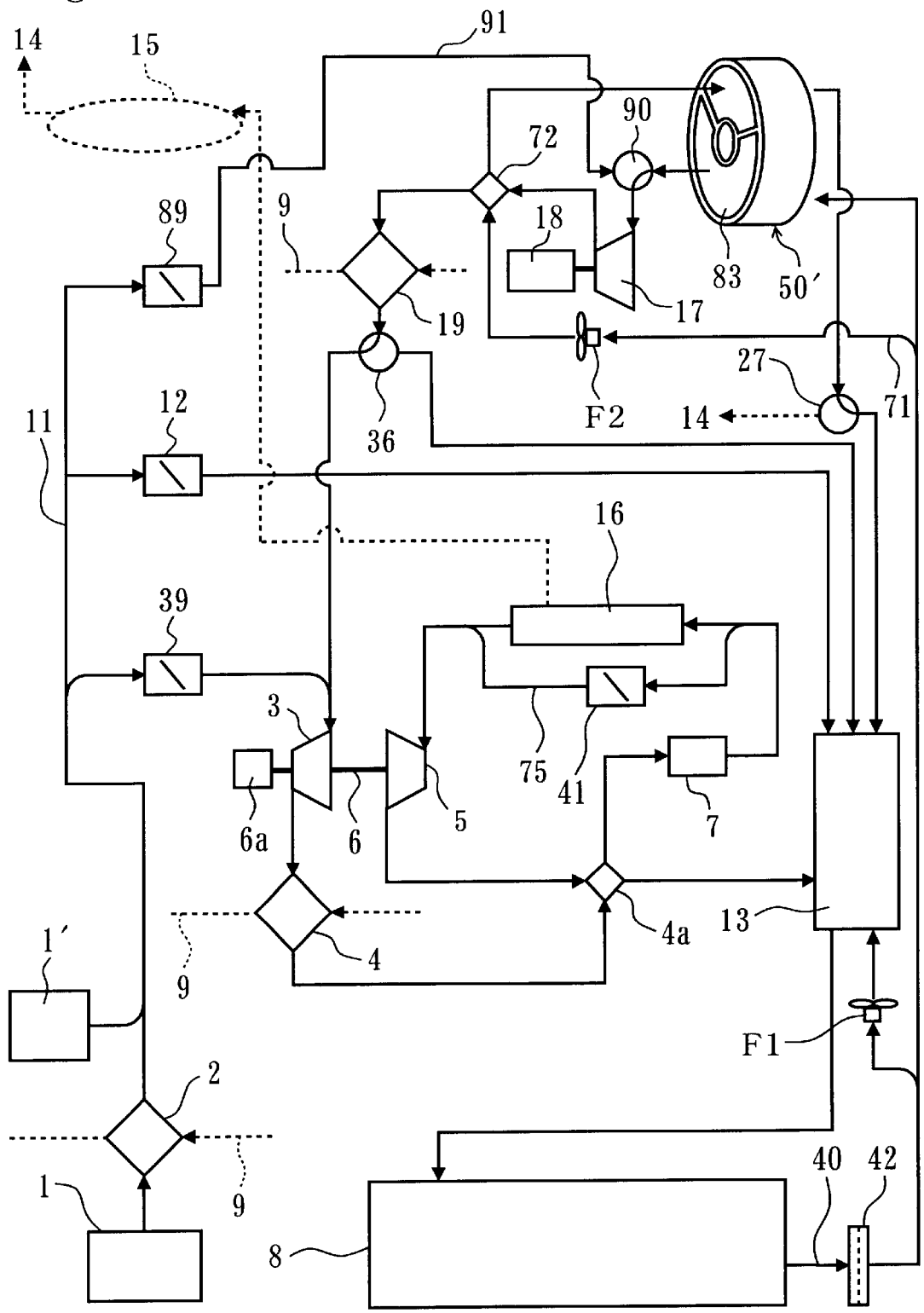
FIG. 8 is a diagram of the construction of an aircraft air conditioner according to a fourth embodiment of the present invention.

FIG. 8 illustrates an aircraft air conditioner according to a fourth embodiment of the present invention; portions which are the same as in the third embodiment are shown with the same reference symbols and the points of difference are described. In this fourth embodiment, when the aircraft is on the ground and the engine is stopped, air extracted from a high-pressure air supply unit 1' such as an APU instead of from the engine 1 is supplied to the air conditioner. Cold air flowing out from the turbine 5 is fed to the cabin 8 including the cockpit space of the aircraft, through a mixing chamber 13 from the regenerating heat exchanger 4a. Some of the air extracted from the engine 1 is fed to the cabin 8 through the mixing chamber 13 from the bypass air flow path 11 by opening the hot-air modulating valve 12.

Some of the air flowing out to the outflow air flow path 40 from the cabin 8 is fed to the mixing chamber 13 through a fan F1. An auxiliary air flow path 71 branched from the outflow air flow path 40 is connected with a regenerating heat exchanger 72. Some of the air flowing out through the outflow air flow path 40 from the cabin 8 is heated by the regenerating heat exchanger 72 after being fed to the auxiliary air flow path 71 by a fan F2.

The adsorption section 83 shown in FIG. 7 is connected through the air flow path changeover mechanism 50' to the auxiliary air flow path 71 and outflow air flow path 40. Specifically, one region 81d in each separator 81 is connected with the auxiliary air flow path 71 through the piping joint 84 while another region 81e is connected with the outflow air flow path 40 through the piping joint 85. In this way, the air flow path changeover mechanism 50' that changes over between a condition in which the adsorption sections 83 are respectively connected with auxiliary air flow path 71 and a condition in which they are connected with outflow air flow path 40 is constituted by rotation of the rotary drum 80.

The air that is fed to the adsorption section 83 from the auxiliary air flow path 71 through the regenerating heat exchanger 72 is fed to the third changeover valve 27. The third changeover valve 27 is capable of changing over the air flow path between a condition in which air that is fed thereto is discharged to the space 14 outside the fuselage and a condition in which it is fed to the cabin 8 through the mixing chamber 13, in response to a signal from the controller (not shown). The air that is fed into the adsorption section 83 from the outflow air flow path 40 is fed to the compressor 17 for compressing prior to mixing that is driven by the motor 18 through a fifth changeover valve 90. Air that is raised in pressure by the compressor 17 is heat-exchanged with air flowing through the auxiliary air flow path 71 in the regenerating heat exchanger 72 and is cooled by air passing through the ram air path 9 outside the fuselage in a radiator 19 that acts instead of the heat exchanger unit 30 of the third embodiment; it is then fed to the fourth changeover valve 36. The fourth changeover valve 36 is capable of changing over the air flow path between a condition in which air that is fed thereto is fed to the cabin 8 through the mixing chamber 13 and a condition in which it is fed to the air cycle cooling device, in response to a signal from the controller.

The temperature of the air flowing through the auxiliary air flow path 71 is for example about 100° C. to 140° C., due to its being heated by the regenerating heat exchanger 72. The temperature of the air flowing in the outflow air flow path 40 from the cabin 8 is for example 20° C. to 30° C. Consequently, since it is at low temperature when the air that is fed through the outflow air flow path 40 from the cabin 8 is flowing, the adsorption agent in the adsorption section 83 absorbs active constituents (in this case water molecules) contained in the air flowing out from the cabin 8. In contrast, since it is at high temperature when the air that is fed through the auxiliary air flow path 71 is flowing, the adsorption agent in the adsorption section 83 releases the water molecules absorbed from the air introduced through the outflow air flow path 40 into the air introduced through the auxiliary air flow path 71 and is thus regenerated.

An auxiliary extracted air flow path 91 is provided through which the extracted air fed from the engine 1 through a flow rate adjustment valve 89 flows. Upstream of the compressor 17 for compressing prior to mixing and downstream of the adsorption section 83, the fifth changeover valve 90 is connected with the auxiliary extracted air flow path 91 and outflow air flow path 40 through which the recirculation air flows. The fifth changeover valve 90 is capable of being changed over between a first condition and a second condition in response to a signal from the controller. When the fifth changeover valve 90 is in the first condition, the recirculation air is fed to the compressor 17 for compressing prior to mixing and the current of the extracted air from the auxiliary extracted air flow path 91 to the compressor 17 for compressing prior to mixing is cut off. When the fifth changeover valve 90 is in the second condition, the extracted air is fed from the auxiliary extracted air flow path 91 to the compressor 17 for compressing prior to mixing and the flow of recirculation air is cut off.

In this way, the same action and benefits as in the case of the third embodiment are presented when the fifth changeover valve 90 is in the first condition. When the fifth changeover valve 90 is in the second condition, the auxiliary extracted air flow path 91 is connected with the compressor 17 for compressing prior to mixing through a part of the outflow air flow path 40 downstream of the flow rate control valve 89. In this way, instead of the recirculation air, the extracted air is compressed by the compressor 17 for compressing prior to mixing and this compressed extracted air is fed to the compressor 3 of the air cycle cooling device. Also, when the fifth changeover valve 90 is in the second condition, the flow rate control valve 39 is fully closed. Consequently, instead of the recirculation air compressed by the compressor 17 for compressing prior to mixing, the total amount of air supplied to the compressor 3 of the air cycle cooling device is made up of the extracted air compressed by the compressor 17. In this way, increase in power consumption can be prevented by putting the fifth changeover valve 90 in the second condition when the aircraft is in a descending condition. That is, because the empty volume in the fuel tank becomes larger during descent of the aircraft because fuel has been consumed and because of the rise of atmospheric pressure during descent, a large amount of nitrogen-enriched gas should be supplied to the fuel peripheral region 15. Furthermore, the pressure of the extracted air is higher than the pressure of the recirculation air even when descending. Consequently, by compressing the extracted air rather than the recirculation air by the compressor 17 for compressing prior to mixing, the energy required to operate the compressor 17 can be reduced by an amount corresponding to the difference of pressures of the extracted air and the recirculation air. As a result, the energy consumption of the equipment as a whole can be reduced.

For example, a case can be imagined wherein the aircraft starts to descend from 42,000 ft (12,800 m), the internal pressure of the cabin 8 is 11.3 psi (77.9 kPa), the pressure of the extracted air is about 20 psi (138 kPa) and it is necessary that the air pressure at the inlet of the compressor 3 should be about 30 psi (207 kPa) in order for the air separating section 16 to operate normally. In this case, if the air pressure at the inlet of the compressor 3 is ensured by compressing the recirculation air by the compressor 17 for compressing prior to mixing, the compression ratio of the compressor 17 is 2.65. In contrast, if the air pressure at the inlet of the compressor 3 is ensured by compressing the extracted air by the compressor 17, the compression ratio of the compressor 17 is 1.5. That is, the compression ratio of the compressor 17 is reduced, so the energy consumption can be reduced. Otherwise the constitution is the same as in the third embodiment and identical portions are indicated by identical reference symbols as in the case of the third embodiment.

Figure 9:
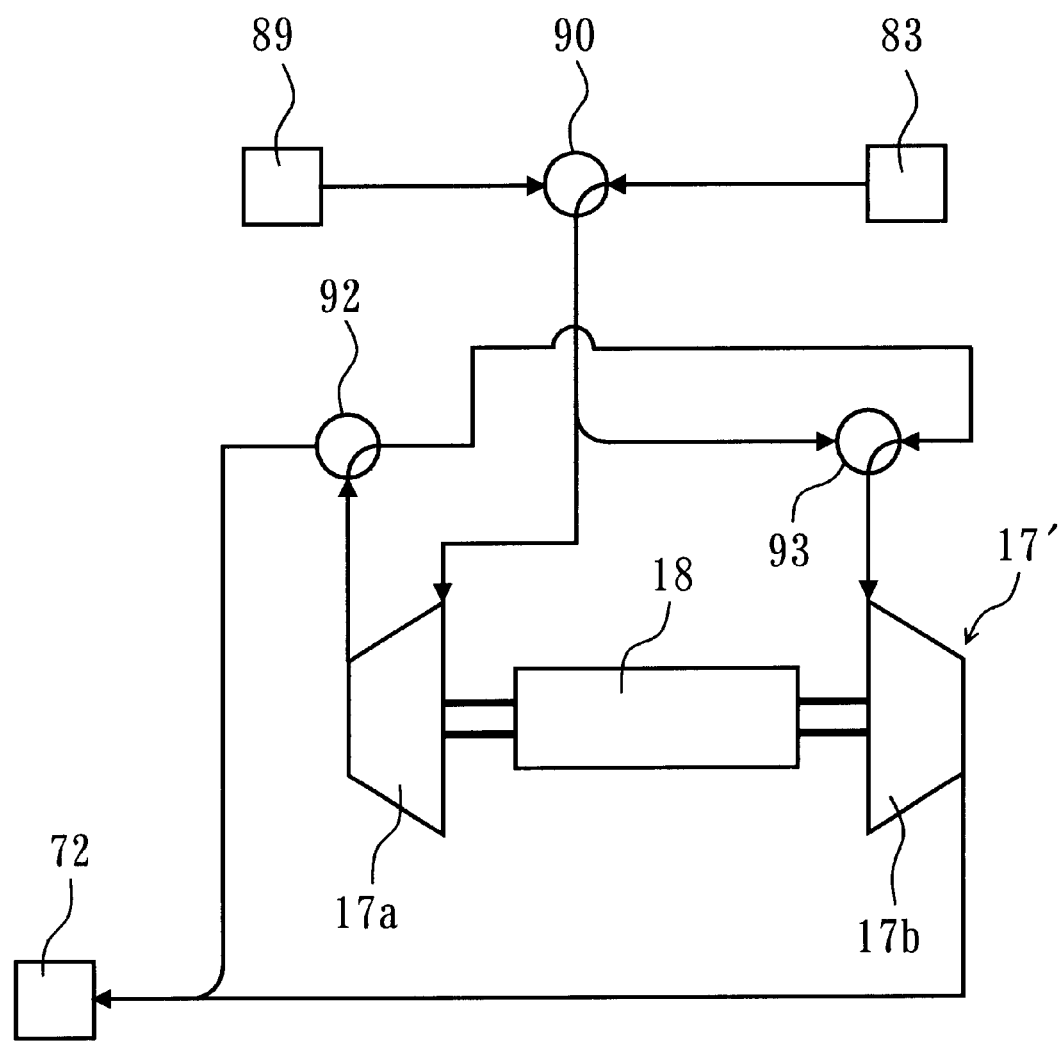
FIG. 9 is a view illustrating the mechanism for changing over connection with the compressor for compressing prior to mixing when the fifth changeover valve is in the first condition, in a modified example of the fourth embodiment of the present invention.
Figure 10:
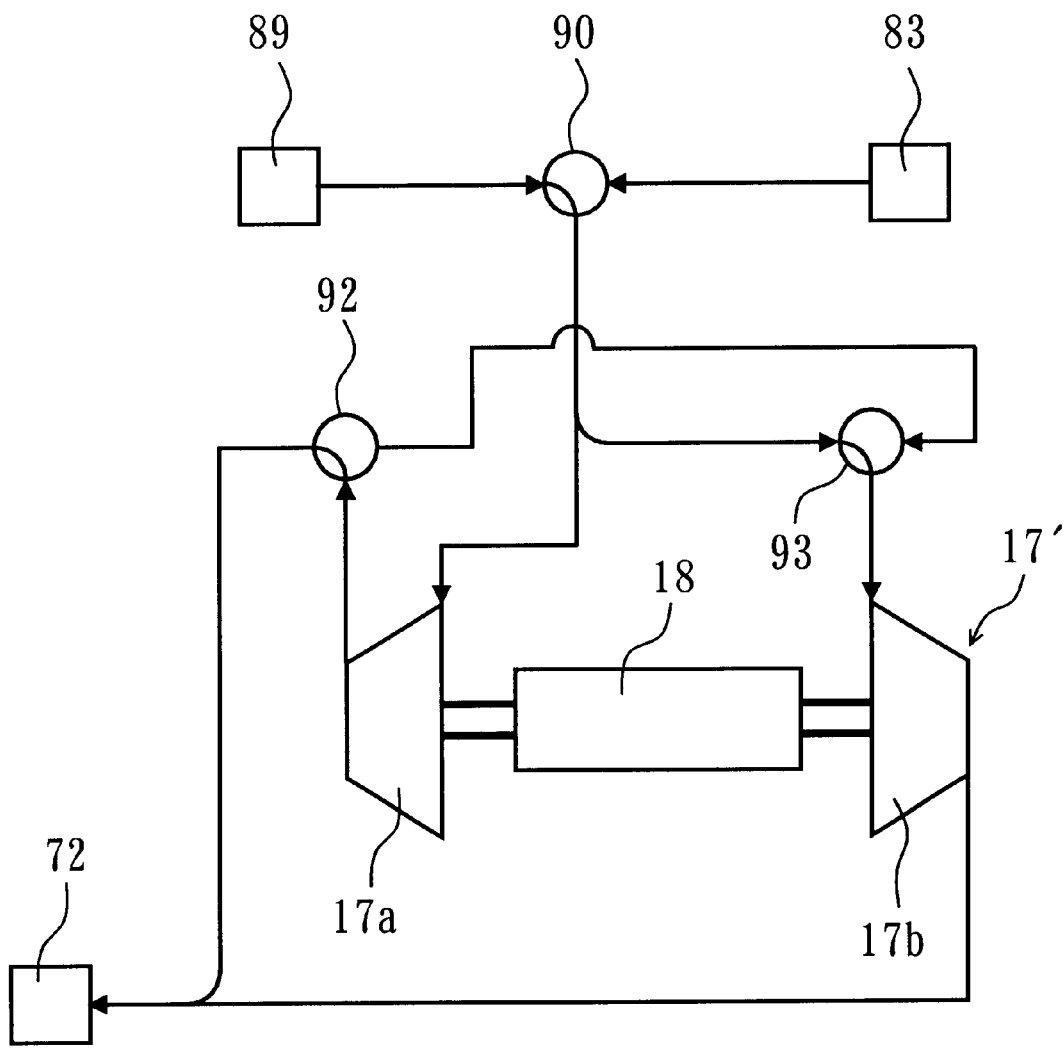
FIG. 10 is a view illustrating the mechanism for changing over connection with the compressor for compressing prior to mixing when the fifth changeover valve is in the second condition, in a modified example of the fourth embodiment of the present invention.

FIG. 9 and FIG. 10 show a connection change over mechanism and a compressor 17' for compressing prior to mixing according to a fourth embodiment. This compressor 17' for compressing prior to mixing has two compression sections 17a and 17b constructed by centrifugal vanewheels. The inlet of one compression section 17a is connected with the fifth changeover valve 90, and the outlet of this compression section 17a is connected with a sixth changeover valve 92. The inlet of the other compression section 17b is connected with a seventh changeover valve 93, and the outlet of this compression section 17b is connected with the regenerating heat exchanger 72. The sixth changeover valve 92 and seventh changeover valve 93 constitute the connection changeover mechanism. When the fifth changeover valve 90 is in the first condition shown in FIG. 9, the sixth changeover valve 92 and seventh changeover valve 93 connect the outlet of the one compression section 17a with the inlet of the other compression section 17b. When the fifth changeover valve 90 is in the second condition shown in FIG. 10, the sixth changeover valve 92 connects the outlet of the one compression section 17a with the regenerating heat exchanger 72 and the seventh changeover valve 93 connects the inlet of the other compression section 17b with the fifth changeover valve 90. That is, when the fifth changeover valve 90 is in the first condition, the two compression sections 17a and 17b are connected in series and when the fifth changeover valve 90 is in the second condition they are connected in parallel. In this way, if the compression ratio in the compressor 17' for compressing prior to mixing is made to be about the same when the fifth changeover valve 90 is in the first condition and when it is in the second condition, the flow rate in the compressor 17' when the fifth changeover valve 90 is in the second condition is about twice what it is when this valve 90 is in the first condition. In this way, increase of power consumption when the aircraft is in a descending condition can be prevented by putting the fifth changeover valve 90 in the second condition. Thus there is no need to increase the number of the compressors 17' for compressing prior to mixing in order to ensure the air flow rate during descent of the aircraft. It should be noted that the compressor 17' for compressing prior to mixing could be provided with three or more compression sections. In this case, the compression sections that are changed over between the series-connected condition and the parallel-connected condition may be at least two.

For example, in descending at 42,000 ft (12,800 m), a case can be imagined wherein the compression ratio at the compression sections 17a, 17b is 1.6 to 1.7, the air pressure of about 30 psi (207 kPa) and the flow rate of about 120 LBS/min (54.4 kg/min) is required at the inlet of the compressor 3, the recirculation air pressure is 11.3 psi (77.9 kPa), the recirculation air temperature is 80° F. (299.8 K), the extracted air pressure is 20 psi (138 kPa), the extracted air temperature is 200° F. (366.5 K), and the efficiency of the compressor 17 for compressing prior to mixing is 75%. In this case, assuming that the recirculation air is compressed by the compressor 17 for compressing prior to mixing, power of 117 kW is required for the compression work and two-stage compression is necessary. In contrast, by compressing the extracted air with the compressor 17, power of 54.7 kW and a single stage compression is sufficient. It should be noted that operation of the sixth changeover valve 92 and seventh changeover valve 93 need not be linked with the fifth changeover valve 90. For example, if the air temperature on the ground is not high, the cabin cooling capacity does not need to be raised, so the inlet pressure of the compressor 3 does not need to be very high. Also, the rate of supply of nitrogen-enriched gas to the fuel peripheral region 15 can be low, so the pressure acting on the selectively permeable membranes of the air separating section need not be high. In such cases, the two compression sections 17a, 17b can be connected in parallel when the fifth changeover valve 90 is in the first condition.

Figure 11:
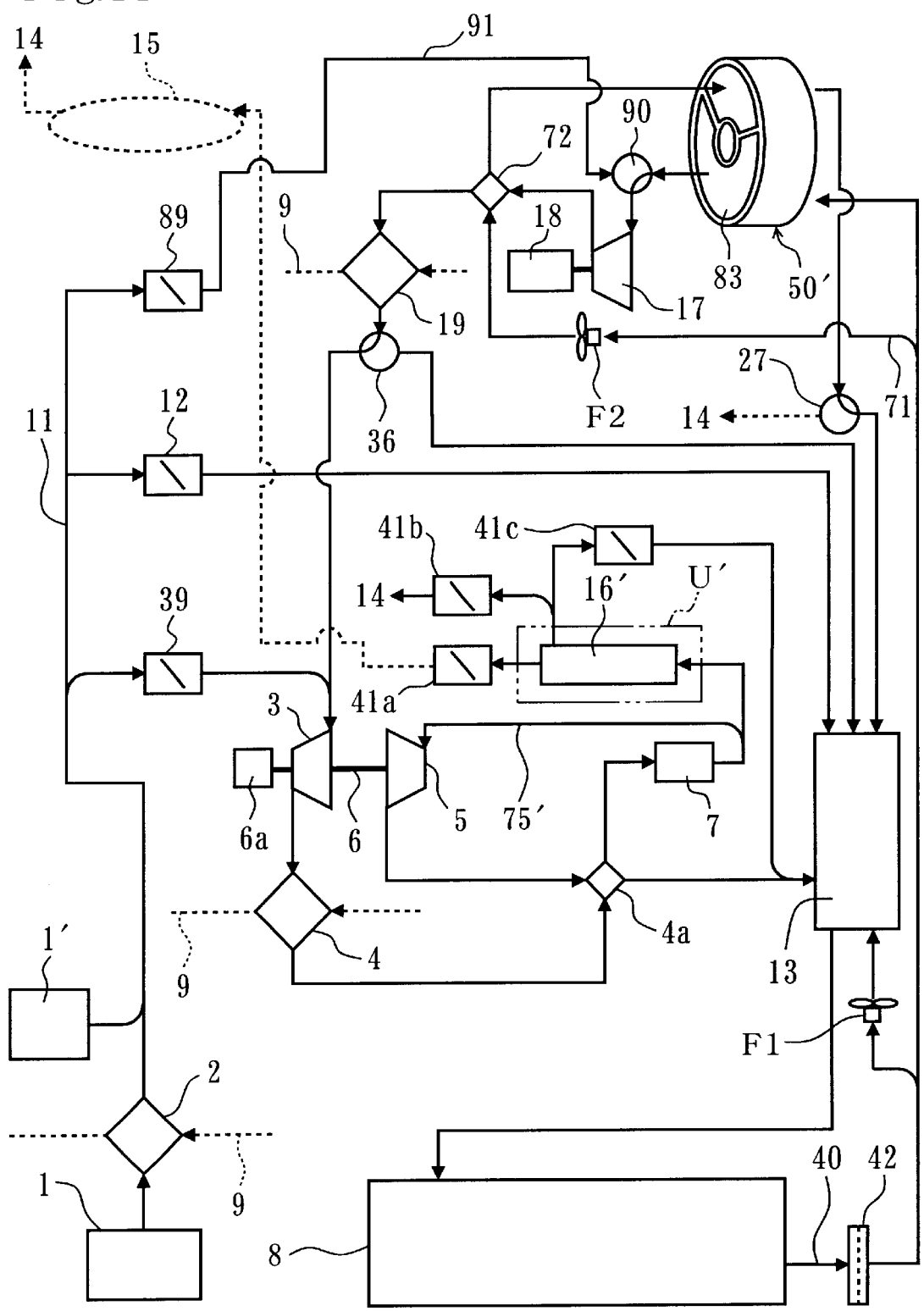
FIG. 11 is a layout diagram of an aircraft air conditioner according to a fifth embodiment of the present invention.
Figure 12:
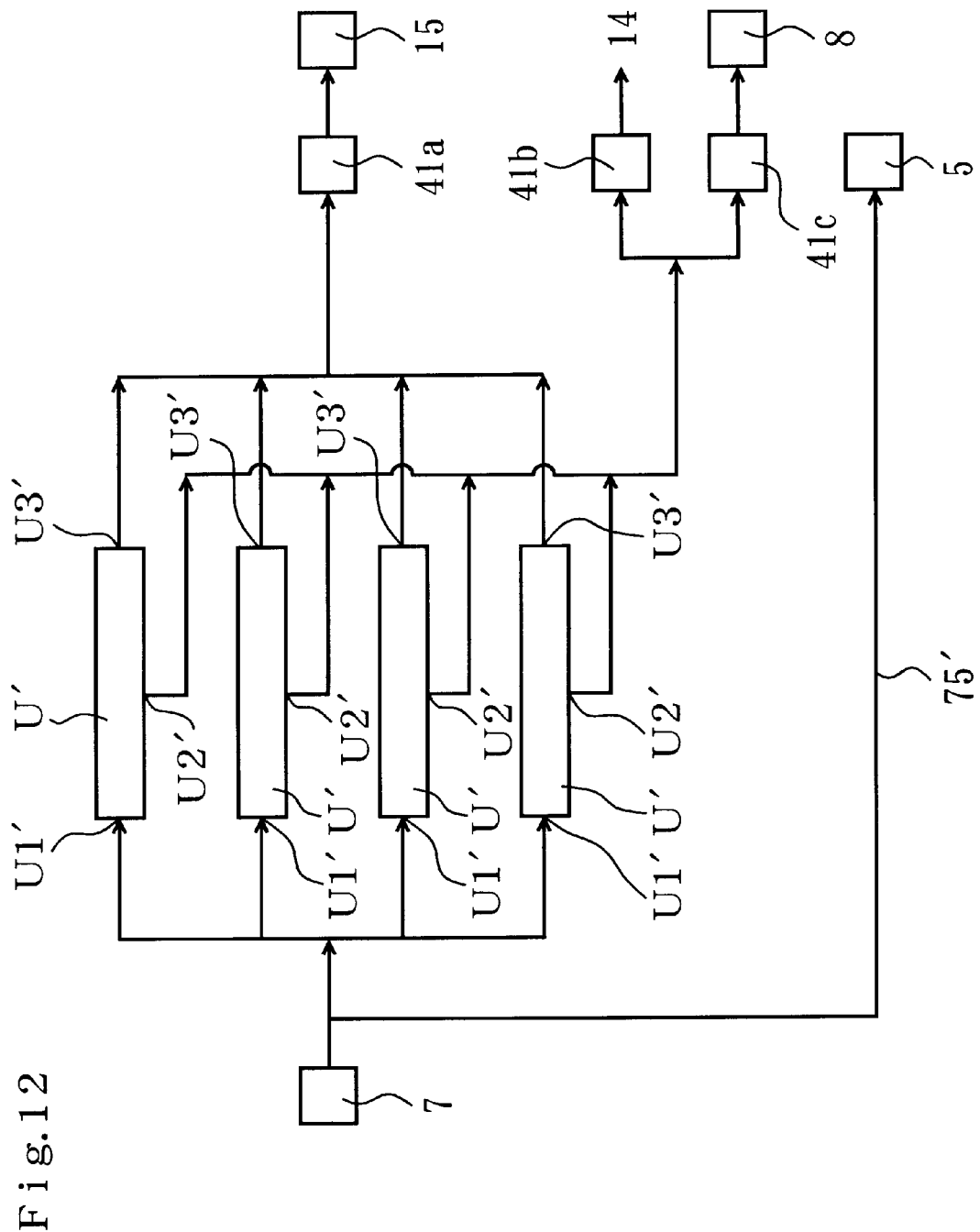
FIG. 12 is a diagram of the arrangement of the air separating unit in an aircraft air conditioner according to the fifth embodiment of the present invention.
Figure 13:
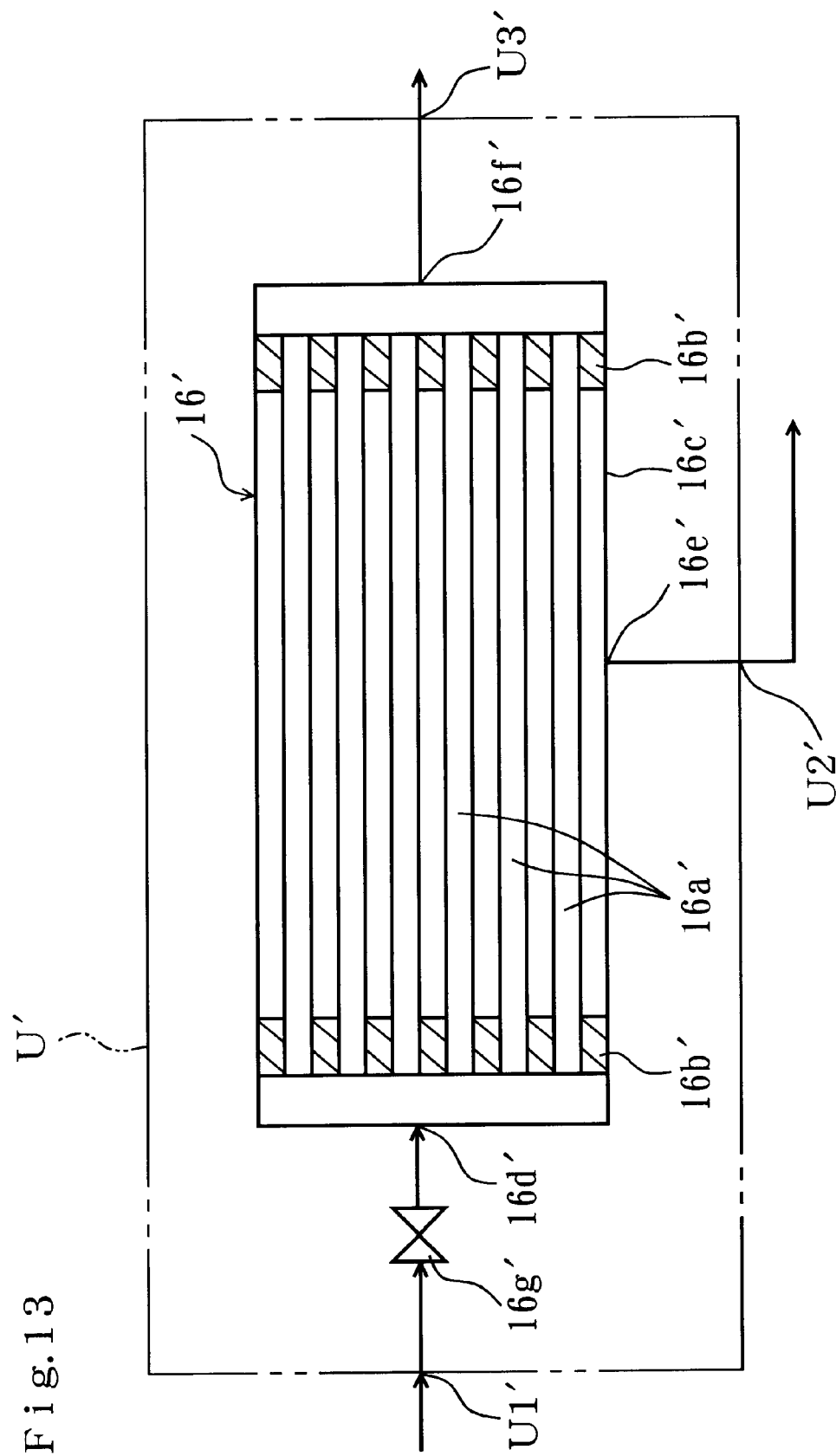
FIG. 13 is a layout diagram of the air separating unit in an aircraft air conditioner according to the fifth embodiment of the present invention.
Figure 14:
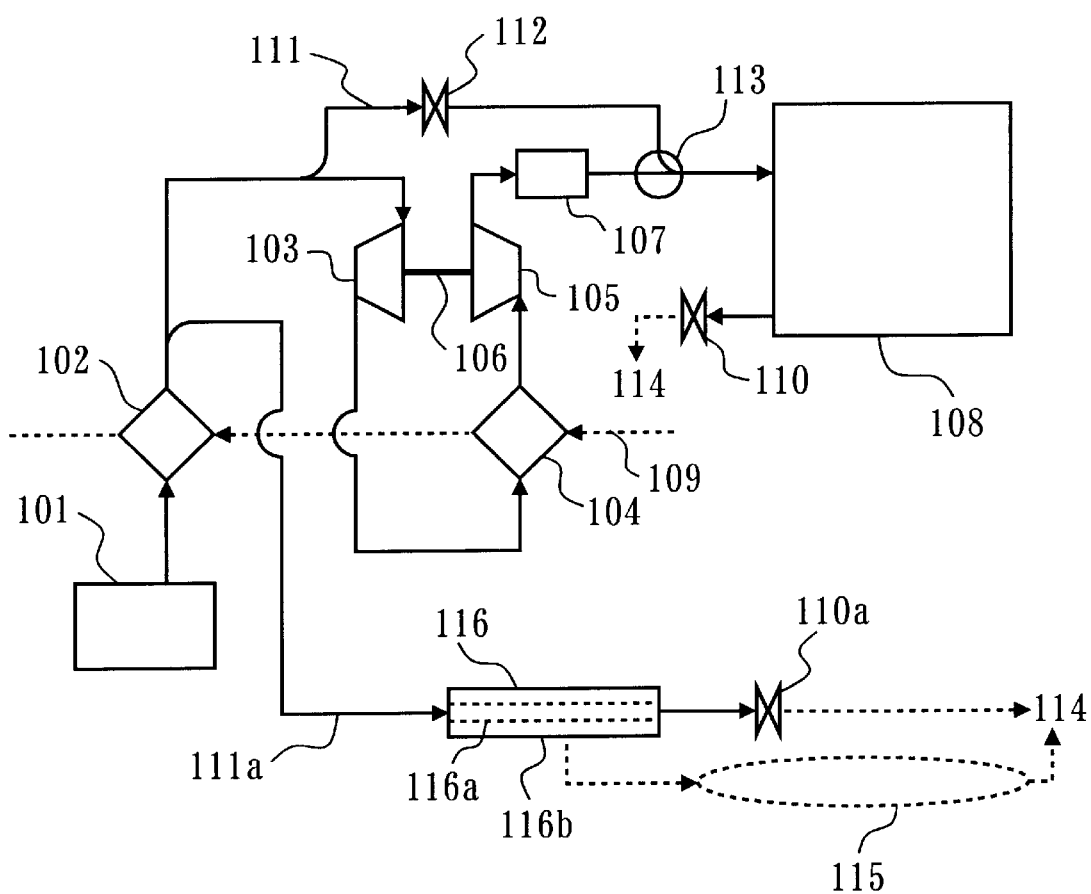
FIG. 14 is a layout diagram of a prior art aircraft air conditioner.

FIG. 11 to FIG. 13 illustrate an aircraft air conditioner according to a fifth embodiment of the present invention; portions which are the same as in the fourth embodiment are indicated by the same reference symbols and points of difference are described. In this fifth embodiment, a normally open air flow path 75' for feeding air from the compressor 3 to the expansion turbine 5 is provided. Some of the air flowing through this air flow path 75' is fed to the air separating sections 16', by which a plurality of air separation units U' mutually connected in parallel are constituted. Each of the separation units U' is connected with first to third control valves 41a, 41b and 41c. The degree of opening of each of the control valves 41a, 41b, 41c is adjusted by signals from the controller. The nitrogen-enriched gas and oxygen-concentrated air are discharged from the air separation units U'. After the nitrogen-enriched gas is fed to the fuel peripheral region 15 through the first control valve 41a, it is discharged to the space 14 outside the fuselage through a discharge path. The oxygen-concentrated air is made capable of being discharged to the space 14 outside the fuselage through the second control valve 41b and is made capable of being introduced into the cabin 8 through the third control valve 41c. The air flow rate passing through the air separation units U' is made capable of being adjusted by adjustment of the degree of opening of each of the control valves 41a, 41b, 41c. The air that is fed into the air flow path 75' is expanded practically adiabatically by the expansion turbine 5.

As shown in FIG. 12, the plurality of air separation units U' (four units in the case of this embodiment) have air inlets U1' that are mutually connected and also connected with the air flow path 75', nitrogen-enriched gas outlets U3' that are mutually connected and are connected with the fuel peripheral region 15 through the first control valve 41a and oxygen-concentrated air outlets U2' that are mutually connected. The oxygen-concentrated air discharge ports U2' are connected with space 14 outside the fuselage through second control valve 41b and are connected with the cabin 8 through the third control valve 41c.

As shown in FIG. 13, the permeability for oxygen ($O_2$) in the air of the selectively permeable membrane 16a' constituting the air separating section 16' is higher than the permeability for nitrogen ($N_2$). In this way, air that has passed through the water separator 7 is separated into nitrogen-enriched gas and oxygen-concentrated air by the air separating section 16'. The selectively permeable membrane 16a' is comprised of a large number of hollow fibers. These hollow fibers are contained in a container 16c' and bundled by having both ends thereof embedded in a resin binder 16b', such as epoxy resin. The space between the inner circumference of container 16c' and the outer circumference of the two ends of the hollow fibers is sealed using the binder 16b'. One end aperture of the container 16c' is connected with one end aperture of each hollow fibers and the air inlet U1', and thus it functions as an air introduction port 16d' connected with the water separator 7. The other end aperture of the container 16c' is connected with the other end aperture of each hollow fibers and the nitrogen-enriched gas outlet U3', and thus it functions as a nitrogen-enriched gas discharge port 16f'. The nitrogen-enriched gas that is discharged from the nitrogen-enriched gas discharge port 16f' is introduced into the fuel peripheral region 15. The aperture formed between both ends of the container 16c' is connected with the outer circumference of the hollow fibers and the oxygen-concentrated air outlet U2', and thus it functions as an oxygen-concentrated air discharge port 16e'. The oxygen-concentrated air that is discharged from the oxygen-concentrated air discharge port 16e is made capable of being introduced into the cabin 8 without passing through the expansion turbine 5. That is, the oxygen-concentrated air that is reduced in pressure by passing through the selectively permeable membranes 16a' can be introduced into the cabin 8 without passing through the expansion turbine 5. In this way, the pressure difference between the outlet of the compressor 3 and the inlet of the expansion turbine 5 is reduced, so that drop in efficiency of the air cycle cooling device can be prevented. A valve 16g' is provided that opens and closes air introduction port 16d' in the air separating section 16'. Otherwise the constitution is the same as in the fourth embodiment and identical portions are indicated by the same reference symbols.

The present invention is not restricted to the embodiments described above.

For example, the number of the adsorption sections in the foregoing embodiments can be three or more, the number of changeover valves being increased in accordance with the increase in number of the adsorption sections. For example, if the number of the adsorption sections is made to be three or more, any one or a plurality of adsorption sections can be connected to the outflow air flow path, the remaining adsorption sections being connected to the bypass air flow path, wherein the adsorption sections connected to the outflow air flow path and the adsorption sections connected to the bypass air flow path are changed over in a pre-set sequence at set time intervals. The adsorption agents 23b, 24b constituting the adsorption sections 23, 24 are not restricted to silica gel or zeolite, and other adsorption agents which have adsorption capability for other substances contained in the air can be employed. The expansion turbines in the above embodiments can be of multi-stage type.

Controller 25 can be arranged to output changeover signals based on signals from temperature sensors, moisture sensors, oxygen sensors etc. provided in the piping etc. connected to the interior of the adsorption sections 23, 24 and/or their inlet/outlet ports. As shown in FIG. 4 to FIG. 6 in the embodiments described above, the state of the air conditioner is altered by adjusting the degree of opening of the valves 12, 39, 41 or by changing over the changeover valves 21, 22, 27, 36 in response to signals from the controller responsive to the condition of the aircraft, instead of this, it is possible to provide a temperature sensor and/or flow rate sensor in the air or coolant flow paths in the air conditioner to adjust the degree of opening of the valves 12, 39, 41 or to change over the changeover valves 21, 22, 27, 36 in response to signals from these sensors.

The extracted air from the engine 1 can be supplied to the adsorption agent 23b, 24b prior to entry into the pre-cooler 2, whereby the adsorption agent 23b, 24b can be regenerated with supply of only a small amount of air since the temperature of the air is high. In the above embodiments, the recirculation air is cooled by the vapor cycle heat exchanger unit 30 prior to mixing with the extracted air, but it is possible to cool the mixture of the recirculation air and the extracted air.

In the embodiment described above, the extracted air is mixed with the recirculation air prior to compression by the compressor 3, but it is possible to mix the extracted air compressed by the compressor 3 with the recirculation air compressed by the compressor 17 for compressing prior to mixing, and then to cool the mixture of extracted air and recirculation air by the main cooler 4.

Furthermore, in the vapor cycle heat exchanger unit 30, it is possible to be changed over to a cabin heating mode in which the recirculating air is heated by heat taken from outside the fuselage depending on conditions.

A plurality of units each of which has the compressor 17 for compressing prior to mixing and the fifth changeover valve 90 may be provided so that some of the fifth changeover valves 90 may be put in the first condition and the remain of the changeover valves 90 may be put in the second condition.

What is claimed is:

1. An aircraft air conditioner wherein air extracted from an engine is cooled by a cooling device and fed into the cabin of the aircraft, comprising:

an air separating section having a selectively permeable membrane arranged at a position through which air flowing in an air flow path of the air conditioner passes, so that it separates the air into nitrogen-enriched gas and oxygen-concentrated air, wherein the nitrogen-enriched gas is fed into a fuel peripheral region of the aircraft, and the oxygen-concentrated air can be fed into the cabin;

the cooling device comprises a compressor and an expansion turbine, and the extracted air is fed into the air separating section after being compressed by the compressor.

2. The aircraft air conditioner according to claim 1, further comprising:

a recirculation air flow path through which air flowing out from the cabin is returned to the cabin;

wherein the recirculation air flow path and the air flow path for the extracted air from the engine are connected to each other such that recirculation air that is returned to the cabin after flowing out from the cabin is mixed with the extracted air, and the mixture of the recirculation air and the extracted air is fed into the air separating section.

3. An aircraft air conditioner wherein air extracted from an engine is cooled by a cooling device and fed into the cabin of the aircraft, comprising:

an air separating section having a selectively permeable membrane arranged at a position through which air flowing in an air flow path of the air conditioner passes, so that it separates the air into nitrogen-enriched gas and oxygen-concentrated air, wherein the nitrogen-enriched gas can be fed into a fuel peripheral region of the aircraft, and the oxygen-concentrated air can be fed into the cabin, a recirculation air flow path through which air flowing out from the cabin is returned to the cabin, wherein the recirculation air flow path and the air flow path for the extracted air from the engine are connected to each other such that recirculation air that is returned to the cabin after flowing out from the cabin is mixed with the extracted air, and the mixture of the recirculation air and the extracted air is fed into the air separating section, wherein the cooling device comprises a compressor and an expansion turbine; and the mixture of the recirculation air and the extracted air is fed into the air separating section after being compressed by the compressor of the cooling device.

4. The aircraft air conditioner according to claim 2 or 3, comprising a compressor for compressing prior to mixing by which the recirculation air is pressurized prior to the mixing with the extracted air.

5. The aircraft air conditioner according to claim 4, wherein the oxygen-concentrated air is expanded by the expansion turbine, and the output of the expansion turbine is employed as power for driving at least one of the cooling device compressor and the compressor for compressing prior to mixing.

6. The aircraft air conditioner according to claim 4, wherein at least one of the cooling device compressor and the compressor for compressing prior to mixing is supplied with at least part of the power necessary for its driving from a motor.

7. The aircraft air conditioner according to claim 5, wherein at least one of the cooling device compressor and the compressor for compressing prior to mixing is supplied with at least part of the power necessary for its driving from a motor.

8. The aircraft air conditioner according to claim 4, further comprising a vapor cycle heat exchanger unit capable of cooling the recirculation air compressed by the compressor for compressing prior to mixing.

9. The aircraft air conditioner according to claim 5, further comprising a vapor cycle heat exchanger unit capable of cooling the recirculation air compressed by the compressor for compressing prior to mixing.

10. The aircraft air conditioner according to claim 6, further comprising a vapor cycle heat exchanger unit capable of cooling the recirculation air compressed by the compressor for compressing prior to mixing.

11. The aircraft air conditioner according to claim 7, further comprising a vapor cycle heat exchanger unit capable of cooling the recirculation air compressed by the compressor for compressing prior to mixing.

12. The aircraft air conditioner according to claim 4 comprising:

an auxiliary extracted air flow path through which said extracted air flows; and a changeover valve connected with said auxiliary extracted air flow path and said recirculation air flow path, upstream of said compressor for compressing prior to mixing, wherein said changeover valve is made capable of changing over between a first condition and a second condition; and when said changeover valve is in the first condition, said recirculation air is fed to said compressor for compressing prior to mixing and the flow of said extracted air from said auxiliary extracted air flow path to said compressor for compressing prior to mixing is cut off; and when said changeover valve is in the second condition, said extracted air is fed from said auxiliary extracted air flow path to said compressor for compressing prior to mixing and the flow of said recirculation air is cut off.

13. The aircraft air condition according to claim 12, wherein said compressor for compressing prior to mixing has a plurality of compression sections; and a mechanism capable of changing over between a condition in which at least two or more of the compression sections are connected in series and a condition in which they are connected in parallel is provided.

14. The aircraft air conditioner according to claim 13, wherein the plurality of compression sections are connected in series when said changeover valve is in the first condition and are connected in parallel when said changeover valve is in the second condition.

15. The aircraft air conditioner according to claim 3, wherein a normally open air flow path for feeding air from said compressor to said expansion turbine is provided in said cooling device, some of the air flowing through the normally open air flow path being fed to said air separating section, the permeability for oxygen of the selectively permeable membrane being higher than the permeability for nitrogen thereof, and the oxygen enriched air that passes through the selectively permeable membrane is made capable of being introduced into said cabin without passing through said expansion turbine.

* * * * *